(12) United States Patent
    Roberts et al.

(10) Patent No.: US 11,151,864 B2
(45) Date of Patent: Oct. 19, 2021

(54) SYSTEM AND METHOD FOR MONITORING A PROPERTY USING DRONE BEACONS

(71) Applicant: Alarm.com Incorporated, Tysons, VA (US)

(72) Inventors: Aaron Lee Roberts, Centreville, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/835,866

(22) Filed: Mar. 31, 2020

(65) Prior Publication Data
US 2020/0394898 A1   Dec. 17, 2020

Related U.S. Application Data

(63) Continuation of application No. 16/118,163, filed on Aug. 30, 2018, now Pat. No. 10,685,558.
(Continued)

(51) Int. Cl.
    *G08B 27/00*    (2006.01)
    *G08B 25/01*    (2006.01)
    (Continued)

(52) U.S. Cl.
    CPC ......... *G08B 27/006* (2013.01); *G05D 1/0094* (2013.01); *G08B 13/1965* (2013.01);
    (Continued)

(58) Field of Classification Search
    CPC .... G08B 27/006; G08B 19/00; G08B 25/014; G08B 25/10; G08B 13/1965;
    (Continued)

(56) References Cited

U.S. PATENT DOCUMENTS 9,804,596 B1   10/2017   Slavin
9,832,751 B2   11/2017   Robinson, Jr.
(Continued)

FOREIGN PATENT DOCUMENTS

WO    WO 2016145447    9/2016

OTHER PUBLICATIONS

PCT International Search Report in International Application No. PCT/US2018/048886, dated Dec. 10, 2018, 15 pages.
(Continued)

*Primary Examiner* — Orlando Bousono
(74) *Attorney, Agent, or Firm* — Fish & Richardson P.C.

(57) ABSTRACT

Methods, systems, and apparatus, including computer programs encoded on a storage device, for monitoring a property using drone beacons. In one aspect, a monitoring system is disclosed that includes a drone, a drone beacon, a component, a processor, and a computer storage media storing instructions that, when executed by the processor, cause the processor to perform operations. The operations may include obtaining drone beacon data generated by the drone beacon, determining a location of the drone beacon based on the drone beacon data, after determining the location of the drone beacon, transmitting, to the drone, a first instruction to navigate towards the location of the drone beacon, after deploying the drone, obtaining component data generated by the component, and after obtaining the component data, transmitting, to the drone, a second instruction to navigate towards a different location than the location of the drone beacon based on the component data.

20 Claims, 7 Drawing Sheets

Related U.S. Application Data

(60) Provisional application No. 62/552,370, filed on Aug. 30, 2017.

(51) Int. Cl.

| | | |
|---|---|---|
| *G08B 25/10* | (2006.01) | |
| *G08B 19/00* | (2006.01) | |
| *H04W 4/021* | (2018.01) | |
| *G08B 13/196* | (2006.01) | |
| *G05D 1/00* | (2006.01) | |

(52) U.S. Cl.
CPC ........... *G08B 19/00* (2013.01); *G08B 25/014* (2013.01); *G08B 25/10* (2013.01); *H04W 4/021* (2013.01); *B64C 2201/123* (2013.01); *B64C 2201/127* (2013.01); *B64C 2201/141* (2013.01); *G08B 13/19656* (2013.01)

(58) Field of Classification Search
CPC ..... H04W 4/021; H04W 4/023; H04W 4/029; H04W 4/80; H04W 64/00; G05D 1/0094
See application file for complete search history.

(56) References Cited

U.S. PATENT DOCUMENTS

| | | | |
|---|---|---|---|
| 9,852,599 | B1 | 12/2017 | Slavin |
| 10,137,984 | B1 | 11/2018 | Flick |
| 10,173,773 | B1 | 1/2019 | Flick |
| 2011/0299732 | A1 | 12/2011 | Jonchery et al. |
| 2015/0260824 | A1 | 9/2015 | Malveaux |
| 2015/0301150 | A1 | 10/2015 | Stuckman et al. |
| 2016/0068264 | A1 | 3/2016 | Ganesh |
| 2016/0107749 | A1 | 4/2016 | Mucci |
| 2016/0116914 | A1 | 4/2016 | Mucci |
| 2016/0189549 | A1 | 6/2016 | Marcus |
| 2016/0205654 | A1 | 7/2016 | Robinson, Jr. |
| 2017/0092109 | A1 | 3/2017 | Trundle et al. |
| 2017/0205827 | A1 | 7/2017 | Rezvani |
| 2017/0300757 | A1 | 10/2017 | Wolf |
| 2017/0301220 | A1 | 10/2017 | Jarrell |
| 2017/0309191 | A1 | 10/2017 | Marcus |
| 2017/0372624 | A1 | 12/2017 | Surcouf et al. |
| 2018/0003792 | A1 | 1/2018 | McCafferty |
| 2018/0039262 | A1 | 2/2018 | Fox |
| 2018/0090016 | A1 | 3/2018 | Nishi |
| 2018/0095155 | A1 | 4/2018 | Soni |
| 2018/0118337 | A1 | 5/2018 | Viel |
| 2018/0322755 | A1 | 11/2018 | Staszel |

OTHER PUBLICATIONS

PCT International Preliminary Report on Patentability in International Application No. PCT/US2018/048886, dated Mar. 3, 2020, 9 pages.

1

SYSTEM AND METHOD FOR MONITORING A PROPERTY USING DRONE BEACONS

CROSS-REFERENCE TO RELATED APPLICATION

This application is a continuation of U.S. application Ser. No. 16/118,163, filed Aug. 30, 2018, now allowed, which claims the benefit of U.S. Provisional Patent Application No. 62/552,370 filed Aug. 30, 2017 and entitled "System and Method for Monitoring an Area Associated with a Property Using Drone Beacons." Both of these prior applications are incorporated by reference in their entirety.

BACKGROUND

A property may include large areas surrounding the property. The large areas may include a yard surrounding a residential house, acreage such as farm land surrounding a farm house, a commercial office complex spread across a campus, industrial land including multiple different warehouses, or a large industrial complex spanning several blocks that includes one or more covered warehouses, factories, or the like.

SUMMARY

According to one innovative aspect of the present disclosure a monitoring system that is configured to monitor a property using drone beacons is disclosed. In one aspect, the monitoring system may include a drone a drone beacon that is configured to generate drone beacon data, a component that is configured to generate component data, and one or more processors and one or more computer readable storage media storing instructions that, when executed by the one or more processors, perform operations that include: obtaining, by the monitoring system, drone beacon data generated by the drone beacon, responsive to obtaining the drone beacon data, determining, by the monitoring system, a location of the drone beacon based on the drone beacon data, after determining the location of the drone beacon, transmitting, by the monitoring system and to the drone, a first instruction to navigate towards the location of the drone beacon, after deploying the drone, obtaining, by the monitoring system, component data generated by the component, and after obtaining the component data, transmitting, by the monitoring system and to the drone, a second instruction to navigate towards a different location that is different than the location of the drone beacon based on the component data.

Other aspects include corresponding methods, apparatus, and computer programs to perform actions of methods defined by instructions encoded on computer storage devices.

These and other versions may optionally include one or more of the following features. For instance, in some implementations, the drone beacon generates the drone beacon data in response to detecting a moving object within a predetermined distance of the drone beacon.

In some implementations, the component generates the component data in response to detecting a moving object within a predetermined distance of the component.

In some implementations, the component generates the component data (i) in response to detecting a moving object and (ii) based on determining that no moving objects within a predetermined distance of the drone beacon.

In some implementations, determining, by the monitoring system, the location of the drone beacon based on the drone beacon data may include extracting, by the monitoring system, the location of the drone beacon from the drone beacon data.

In some implementations, determining, by the monitoring system, the location of the drone beacon based on the drone beacon data may include extracting, by the monitoring system, an identifier of the drone beacon from the drone beacon data, and obtaining, by the monitoring system, the location of the drone beacon from a memory device storing a plurality of drone beacon locations using the identifier of the drone beacon.

In some implementations, obtaining, by the monitoring system, component data generated by the component may include obtaining, by the monitoring system, additional drone beacon data generated by an additional drone beacon that is located at a different location than the drone beacon. In such implementations, after obtaining the component data, transmitting, by the monitoring system and to the drone, a second instruction to navigate towards a different location that is different than the location of the drone beacon based on the component data may include after obtaining the additional drone beacon data, transmitting, by the monitoring system and to the drone, a second instruction to navigate towards a location of the second drone beacon.

In some implementations, the first instruction that instructs the drone to navigate towards the location of the drone beacon may include an instruction for the drone to deploy from a drone station and navigate towards the location of the drone beacon.

In some implementations, the first instruction may include a location of the drone beacon.

In some implementations, the first instruction may include an identifier of the drone beacon without including data that explicitly describes a location of the drone beacon.

In some implementations, the second instruction instructs the drone to adjust the drone's navigation direction or the drone's navigation speed.

In some implementations, the drone beacon data or the component data may include an image captured by a camera.

In some implementations, the component may include a camera, a motion sensor, a drone sensor, a drone camera, or a drone beacon.

According to another innovate aspect of the present disclosure, a method for monitoring a property using drone beacons is disclosed. In one aspect, the method may include obtaining, by a monitoring system, drone beacon data generated by a drone beacon, responsive to obtaining the drone beacon data, determining, by the monitoring system, a location of the drone beacon based on the drone beacon data, after determining the location of the drone beacon, transmitting, by the monitoring system and to a drone, a first instruction to navigate towards the location of the drone beacon, after deploying the drone, obtaining, by the monitoring system, component data generated by a component of the monitoring system, and after obtaining the component data, transmitting, by the monitoring system and to the drone, a second instruction to navigate towards a different location that is different than the location of the drone beacon based on the component data.

Other aspects include corresponding methods, apparatus, and computer programs to perform actions of methods defined by instructions encoded on computer storage devices.

These and other versions may optionally include one or more of the following features. For instance, in some implementations, the drone beacon generates the drone beacon data in response to detecting a moving object within a predetermined distance of the drone beacon.

In some implementations, the component generates the component data in response to detecting a moving object within a predetermined distance of the component.

In some implementations, the component generates the component data (i) in response to detecting a moving object and (ii) based on determining that no moving objects within a predetermined distance of the drone beacon.

In some implementations, the first instruction instructs the drone to navigate towards the location of the drone beacon may include an instruction for the drone to deploy from a drone station and navigate towards the location of the drone beacon.

In some implementations, obtaining, by the monitoring system, component data generated by the component may include obtaining, by the monitoring system, additional drone beacon data generated by an additional drone beacon that is located at a different location than the drone beacon. In such implementations, after obtaining the component data, transmitting, by the monitoring system and to the drone, a second instruction to navigate towards a different location that is different than the location of the drone beacon based on the component data may include after obtaining the additional drone beacon data, transmitting, by the monitoring system and to the drone, a second instruction to navigate towards a location of the second drone beacon.

In some implementations, determining, by the monitoring system, the location of the drone beacon based on the drone beacon data may include extracting, by the monitoring system, an identifier of the drone beacon from the drone beacon data, and obtaining, by the monitoring system, the location of the drone beacon from a memory device storing a plurality of drone beacon locations using the identifier of the drone beacon.

In some implementations, the component may include a camera, a motion sensor, a drone sensor, a drone camera, or a drone beacon.

DETAILED DESCRIPTION

Figure 1:
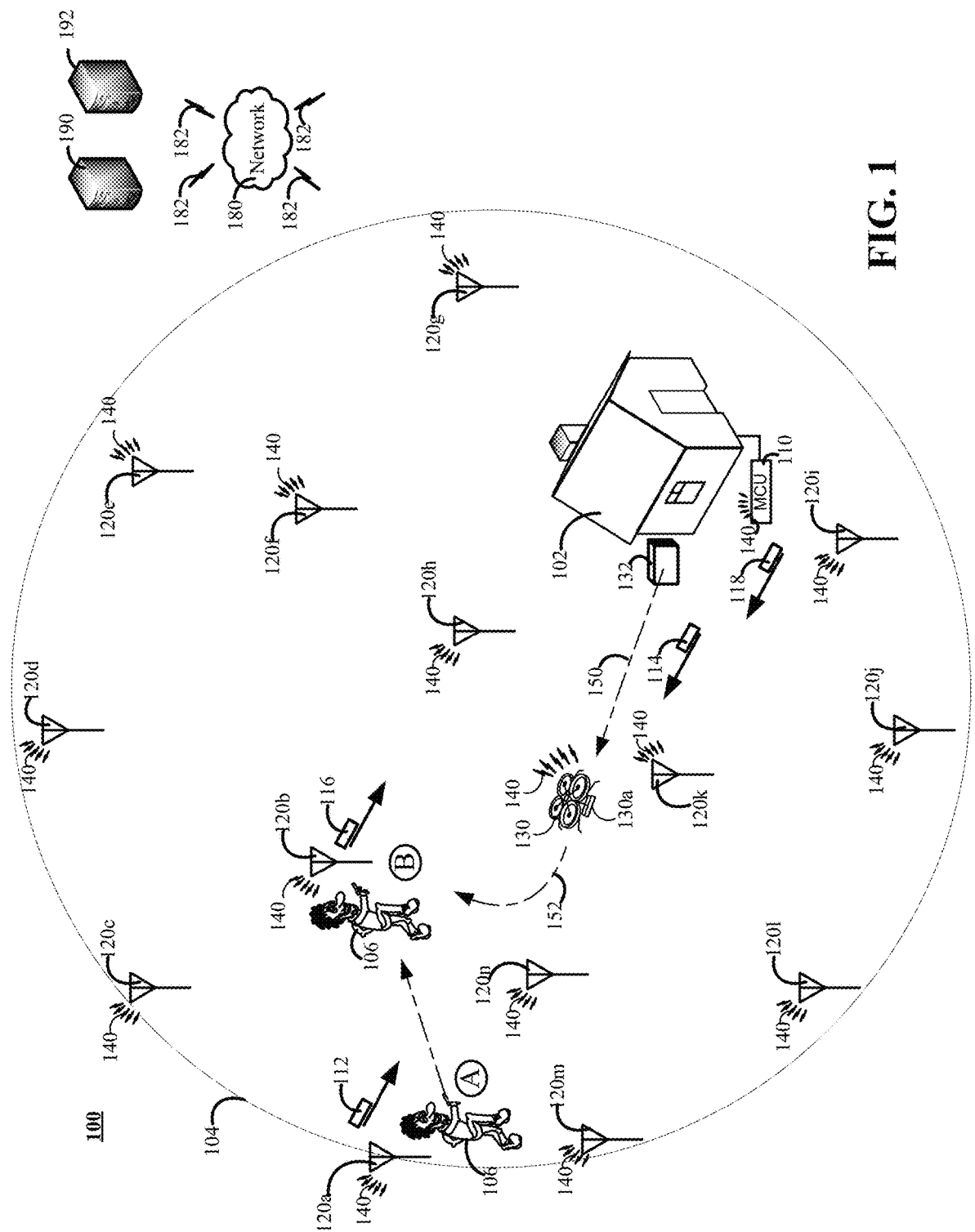
FIG. 1 is a contextual diagram of an example of a monitoring system that uses a monitoring system control unit to monitor a parcel of land surrounding a property using drone beacons.

Monitoring a parcel of land surrounding a property using a monitoring system can be costly, difficult, and sometimes impractical. In particular, the challenges in monitoring a parcel of land surrounding a property using a monitoring system can increase as the square footage of the property being surveilled increases. Therefore, a more efficient system for monitoring a parcel of land surrounding a property is needed.

A property may include a residential structure such as an apartment, a townhome, a single-family home, or the like. Alternatively, a property may include any other type of structure such as a commercial building, an industrial building, or the like.

A parcel of land surrounding a property may include real property that surrounds a physical property from the property itself (e.g., a physical structure) to a property line that defines the real property that is owned by an owner of the property. In some implementations, the parcel of land surrounding the property may have additional structures such as one or more sheds, garages, barns, office buildings, warehouses, or the like. Alternatively, or in addition, the parcel of land surrounding the property may also include hills, forests, lakes, or the like, all of which can be monitored using the system and method described, herein.

The present disclosure provides a system and method for monitoring a parcel of land surrounding a property using drone beacons. A drone beacon may include, for example, a device that can be installed in a portion of the parcel of land surrounding a property that can (i) detect the presence of an object, and (ii) communicate data to another device indicating that the presence of an object has been detected. The drone beacon may detect the presence of an object using, for example, an infrared motion sensor in a single direction or an infrared motion sensor in multiple directions. The drone beacon may wirelessly communicate data to another device indicating that the presence of an object has been detected using, for example, a cellular communications device such as a M2M communications module. A monitoring system control unit, monitoring application server, or a drone may detect the communication from drone beacon. A drone may be deployed to capture video of the vicinity of the parcel of land associated with the drone beacon that originated the communication. In some implementations, the drone's navigation path may be adjusted mid-flight based on communications received from one or more other drone beacons that indicate the detection of an object. The deployed drone's navigation path can be adjusted based on sensor data generated by respective drone beacons until the drone arrives in the vicinity of the drone beacon communicating sensor data indicative of an event such as movement. The drone can begin capturing video of the portion of the parcel that is in the vicinity of the drone beacon communicating sensor data indicative of an event such as movement once the drone arrives at the vicinity of a drone beacon communicating sensor data indicative of an event such as movement. Thus the drone and drone beacons can be used to capture video surveillance footage of a parcel of land surrounding a property without the inconvenience, impracticality, or both of installing multiple cameras at different locations throughout the parcel.

FIG. 1 is a contextual diagram of an example of a monitoring system 100 that uses a monitoring system control unit 110 to monitor a parcel of land surrounding a property 102 using drone beacons 120a, 120b, 120c, 120d, 120e, 120f, 120g, 120h, 120i, 120j, 120k, 120l, 120m, 120n.

With reference to the example of FIG. 1, the monitoring system 100 includes a monitoring system control unit 110, multiple 120a, 120b, 120c, 120d, 120e, 120f, 120g, 120h, 120i, 120j, 120k, 120l, 120m, 120n, a drone 130, a drone charging station 132, and a network 140. In some implementations, the monitoring system 100 may also include a network 180, one or more communications links 182, a monitoring application server 190, a central alarm station server 192, or a combination thereof.

With reference to the example of FIG. 1 at stage A, a trespasser 106 may penetrate the boundary 104 of a parcel of land surrounding the property 102. A drone beacon 120a may detect the trespasser 106. For example, a motion sensor of the drone beacon 120a may detect movement by trespasser 106, a thermal sensor of the drone beacon 120a may detect a thermal signature associated with the trespasser 106, an audio sensor may detect noises caused by the trespasser 106, or the like. The drone beacon 120b may generate and broadcast sensor data 112 that is indicative of a potential event in response to the detection of the trespasser 106. The sensor data 112 may include a drone beacon identifier and data indicating that the drone beacon 120a has detected a potential event. The sensor data 112 may be broadcast using the network 140. The network 140 may include one or more of a wireless LAN, a wireless WAN, a cellular network, a z-wave network, a ZigBee network, LoRa, LoRaWAN, the Internet, or a combination thereof. In some implementations, such as when the parcel of land is large (e.g., an industrial complex with 5 acres storage yards, a residential property on 25 acres, a farm on hundreds of acres, or the like) network 140 may be limited to wireless networks such as cellular networks between the drone beacon such as drone beacon 120a and the monitoring system control unit 110 that is sufficient to facilitate communication across a long expanse such as tens of acres, or more.

During stage A, the monitoring system control unit 110 may detect (or otherwise receive) the sensor data 112 and transmit an instruction 114 to the drone 130 that instructs the drone to immediately deploy from a charging station 132 along a first navigation path 150. The instruction may include a drone beacon identifier of the drone beacon that broadcast sensor data 112. The monitoring system control unit 110 can determine the drone beacon identifier of the drone beacon broadcasting the sensor data 112 from the sensor data 112. Instructing the drone to immediately deploy may include, for example, instructing the drone 130 to deploy (i) in the direction of drone beacon 140 and (ii) without the drone 130 "knowing" its final destination point. The drone 130 does not "know" its final destination point yet because, e.g., the trespasser 106 may still be moving at the point in time that the drone beacon 120a detects the trespasser 106. However, to provide the advantages of the present disclosure such as video monitoring of a parcel of land surrounding a property 102, the monitoring system control unit 110 needs to get the drone 130 to the vicinity of the detected event as soon as practicable. Thus, the monitoring system control unit 110 sends the instruction 114 to the drone 130 to launch at the first detection of sensor data 112 generated by a first drone beacon 120a. While the drone 130 is traveling (e.g., flying through the air, driving on the ground, floating on water, or the like) along a navigation path 150, the monitoring system control unit 110 may continue to analyze sensor data generated by one or more drone beacons 120a, 120b, 120c, 120d, 120e, 120f, 120g, 120h, 120i, 120j, 120k, 120l, 120m, 120n provided from one or more drone 130 mounted sensors, or a combination thereof, in order to generate an adjusted flight path 152 for the drone 130.

The drone 130 may store a map of the respective drone beacons 120a, 120b, 120c, 120d, 120e, 120f, 120g, 120h, 120i, 120j, 120k, 120l, 120m, 120n in its memory, and use the map to navigate the property. The map may include, for example, data structure that associates a drone beacon identifier with a location such as a GPS location. In response to receiving an instruction 114 from the monitoring system control unit 110, the drone 130 may depart from the drone charging station 132. The drone 130 may access the map and identify a GPS location that corresponds to the drone beacon identifier in the instruction 114 received from the monitoring system control unit 110. The drone 130 may obtain the identified GPS location of the drone beacon that broadcast the sensor data 112, and begin navigating to the obtained GPS location. Other types of maps may be used by the drone 130 to navigate a property.

For example, the drone 130 may store a three-dimensional map of the parcel of land surrounding the property 102. The three-dimensional map may include markers associated with each known drone beacon 120a, 120b, 120c, 120d, 120e, 120f, 120g, 120h, 120i, 120j, 120k, 120l, 120m, 120n. Each marker may be associated with a location such as GPS location, a predetermined distance from the drone charging station 132 (or other point of reference) to each respective marker, or the like. In some implementations, the point of reference may be dynamically determined based on the drone's 130 particular location on the parcel of land surrounding the property 102 at any particular point in time. The three-dimensional map may allow a drone to navigate the parcel of land surrounding the property 102 and avoid obstacles the drone 130 may encounter during navigation.

Alternatively, or in addition, the drone 130 may include a map from a top-down, aerial viewpoint of the parcel of land surrounding the property 102. The map may include a marker identifier each drone beacon 120a, 120b, 120c, 120d, 120e, 120f, 120g, 120h, 120i, 120j, 120k, 120l, 120m, 120n. Each marker may be associated with a location such as GPS location, a predetermined distance from the drone charging station 132 (or other point of reference) to each respective marker, or the like. In some implementations, the point of reference may be dynamically determined based on the drone's 130 particular location on the parcel of land surrounding the property 102 at any particular point in time.

At stage B, the trespasser 106 has moved from within the vicinity of the drone beacon 120a to the vicinity of the drone beacon 120b while the drone 130 is in the process of navigating from the drone charging station 132 along the navigation path 150 towards the drone beacon 120a. The drone beacon 120b can detect the trespasser 106. The drone beacon 120 can generate and broadcast sensor data 116 in response to the detection of the trespasser 106. The monitoring system control unit 110 can detect the broadcasted sensor data 116, and transmit an instruction 118 to the drone 130 that instructs the drone 130 to adjust its navigation path from a first navigation path 150 to a second navigation path 152 to where a drone beacon 120b is currently detecting a trespasser 106. Adjusting the drone's first navigation path 150 can include adjusting the drone's 130 direction of travel, speed of travel, or the like. This method of adjusting the drone's 130 navigation path after the drone is already in route allows the drone 130 to arrive in vicinity of a sensor 120b faster than if the monitoring system control unit 110 waited to dispatch the drone 130 to drone beacon 120b until after sensor data 116 was detected.

In some implementations, multiple drone beacons 120a, 120b, 120c, 120d, 120e, 120f, 120g, 120h, 120i, 120j, 120k, 120l, 120m, 120n may be detecting movement at one time. For example, drone beacons 120a, 120b, 120n may be positioned close enough that each of the drone beacons may be detecting movement at the same time or within a predetermined amount of time of each other. In such instances, the monitoring system control unit 110 can use the sensor data generated from each respective drone beacon 120*a*, 120*b*, 120*n* to triangulate the location of the moving object, and transmit one or more instructions to the drone 130 that instruct the drone 130 to adjust the drone's navigation path 152 to travel to the location of the detected object (as opposed to drone beacon that most recently detected movement.

In some implementations, the drone 130 may also use drone-collected data such as sensor data generated by one or more drone mounted sensors, video (or images) captured using one or more drone mounted cameras, or a combination thereof to adjust the drone's flight path. In some implementations, adjusting the drone's 130 flight path towards a particular portion of the parcel of land surrounding the property 102 may be based on both drone-collected data and instructions received from the monitoring system control unit 110. Alternatively, in some instances, the drone 130 may adjust the drone's flight bath based on the drone-collected data and independent of the instructions received from the monitoring system control unit 110. For example, as a drone 130 arrives within a predetermined distances of a drone beacon such as drone beacon 120*b*, the drone 130 may rely solely on the drones 130 sensors to detect an object such as a trespasser 106 within a vicinity of the drone beacon 120*b*.

The drone 130 may capture video of the vicinity of the drone beacon that most recently generated sensor data indicating of a potential event once the drone 130 arrives within a predetermined distance of the drone beacon. With reference to FIG. 1, for example, the drone 130 may begin using a drone-mounted camera 130*a* to capture video, images, or both, of the parcel of land in the vicinity of the drone beacon 120*b* because the drone beacon 120*b* is the last drone beacon to generate sensor data (e.g., sensor data 116) that is indicative of a potential event. The captured video, images, or both may be streamed back to a computer monitor, a display of a mobile device, or a storage device via the network 140 for review by a user. Alternatively, or in addition, the captured video, images, or both, can be stored in a drone-mounted storage device of the drone 130. Video, images, or both stored in a drone-mounted storage device may be uploaded to another device for viewing, storage, or both, once the drone 130 returns to the drone charging station 132. For example, the drone charging station 132 (or other device) may use a port such as a USB port to connect to the drone 130. The charging station (or other device) may download the videos, images, or both, captured by drone 130, and then provide a user with the opportunity to review the downloaded videos. Alternatively, or in addition, the video, images, or both may be downloaded from the drone to a user device using Wi-Fi so that the video, images, or both, can be viewed by a user.

In some implementations, the captured video that is streamed back to a monitoring system control unit 110 may be used to further adjust the drone's navigation path. For example, the monitoring system control unit 110 may analyze the captured video for the presence of one or more objects such as a person, an animal, or the like. In some implementations, the monitoring system control unit 110 may use computer vision techniques to detect objects (e.g., a person, an animal, or the like) in the streamed video, and then transmit instructions to the drone 130 that instruct the drone 130 to adjust the drone's 130 navigation path 152 so that the drone 130 can position itself in an orientation that is best suited to capture video, images, or both of a detected object. Adjusting the drone's navigation path 152 can include adjusting the drone's 130 direction of travel, speed of travel, or the like. Alternatively, or in addition, adjusting the drone's 130 navigation path 152 may also include reorienting the drone 130 to put the drone 130 on an angle of approach that is better suited for capturing video of a detected object. In some implementations, the captured video may have been captured with a thermal camera, and the video can be analyzed for the presence of heat that is indicative of a person, animal, or the like. Using such techniques, the drone 130 can precisely approach an object and capture video of an object detected by one or more drone beacons 120*a*, 120*b*, 120*c*, 120*d*, 120*e*, 120*f*, 120*g*, 120*h*, 120*i*, 120*j*, 120*k*, 120*l*, 120*m*, 120*n*, as opposed to navigating directly to the beacon that most recently generated sensor data indicative of movement.

The monitoring system 100 described with reference to FIG. 1 provides a system that can facilitate monitoring (e.g., video monitoring) of a parcel of land that surrounds a property 102 without installing cameras throughout the parcel of land that surrounds the property 102. Instead of installing cameras throughout the parcel of land that surrounds the property 102, drone beacons can be installed throughout the property and a drone 130 may be deployed based on sensor data generated from one or more respective drone beacons.

Each drone beacon 120*a*, 120*b*, 120*c*, 120*d*, 120*e*, 120*f*, 120*g*, 120*h*, 120*i*, 120*j*, 120*k*, 120*l*, 120*m*, 120*n* may be, for example, staked into the ground of the parcel of land surrounding the property 102. In some implementations, the drone beacons may be installed around the perimeter of the parcel of land that surrounds the property 102, scattered through the parcel of land at a variety of distances between the boundary line 104 of the parcel of land and the property 102, or a combination thereof.

The drone beacons may be rugged to ensure continued and reliable functionality in all different types of weather environments. The drone beacons may come in a variety of different shapes and sizes with no restrictions. However, in some implementations, the drone beacons may be the size of, e.g., a shotgun shell. This can allow the drone beacons to be installed through a parcel of land that surrounds the property 102 without being an eye-sore. Each drone beacon may be configured to be staked into the ground or mounted to a tree, telephone pole, or other object in the parcel of land surrounding the property 102.

The drone beacon may be powered in a variety of ways. For example, the drone beacon may include one or more internal batteries. In some implementations, the internal batteries may be batteries that need to be switched once the batteries have been powered down. Alternatively, in other implementations, the drone beacon may include one or more solar cells, solar panels, or the like that can be used to charge one or more internal batteries during daylight time periods. The drone beacon, when equipped with one or more solar cells, solar panels, or the like can be used allow the drone beacon to be installed in a parcel of land surrounding the property 102 for long periods of time without needed to be directly connected to a power source, without requiring a change in battery, or the like.

In the example of FIG. 1, each drone beacon 120*a*, 120*b*, 120*c*, 120*d*, 120*e*, 120*f*, 120*g*, 120*h*, 120*i*, 120*j*, 120*k*, 120*l*, 120*m*, 120*n* may be configured to directly communicate with the monitoring system control unit 110 via the network 140. However, the present disclosure need not be so limited. For example, in some implementations, each of the drone beacons 120*a*, 120*b*, 120*c*, 120*d*, 120*e*, 120*f*, 120*g*, 120*h*, 120*i*, 120*j*, 120*k*, 120*l*, 120*m*, 120*n* may be interconnected as a mesh network of drone beacons. In such instances, only the subset of the drone beacons such as one or more of the closest drone beacons 120*h*, 120*k*, 120*i* to of the property 120 may be configured to communicate with the monitoring system control unit 110 using network 140. In such instances, a movement detected by a perimeter drone beacon 120*a* may be communicated to each respective drone beacon in the mesh network of drone beacons. Then, one of the closest drone beacons to the property such as 120*h* can communicate data associated with the detected movement to the monitoring system control unit 110. The monitoring system control unit 110 can instruct the drone 130 to deploy, or adjust its navigation path based on the data received from the closest drone beacon.

The example of FIG. 1 describes a monitoring system 100 that detects, and captures video of, a trespasser 106. However, the present disclosure need not be so limited. Instead, the monitoring system 100 can deploy a drone 130 to capture video of any event that is detected by a drone beacon. For example, a drone 130 may be deployed to capture video of a vicinity of a drone beacon that detects movements by one or more animals on the parcel of land surrounding the property 102.

The example of FIG. 1 describes a monitoring system control unit 140 that detects sensor data generated by one or more drone beacons and transmits instructions to a drone to deploy and capture video in the vicinity of one or more drone beacons that have detected the likely presence of an object. However, the present disclosure should not be limited to a local monitoring system control unit 140 that is installed at the property 102. For example, all of the functionality described with reference to the monitoring system control unit 110 may also be performed by a monitoring application server 190 that is accessible via one or more remote networks 180.

In some implementations, both a monitoring system control unit 110 and a monitoring application server 190 may be used. For example, the monitoring system control unit 110 can detect sensor data generated and broadcast by one or more drone beacons, and then relay the drone beacon data to the monitoring application server 190 for analysis. Similarly, the monitoring system control unit 190 may receive video, images, or both, streamed from the drone 130, and then relay the received video, images, or both to the monitoring application server 190 for analysis to detect whether one or more objects are depicted in the videos, images, or both. The monitoring application server 190 may transmit one or more instructions based on the analysis of sensor data, video or image data, or a combination thereof, that instruct the drone 130 to adjust the drone's 130 flight path. The instructions may be transmitted directly to the drone 130 by the monitoring application server 190. Alternatively, the monitoring application server 190 can communicate instructions to the monitoring system control unit 110 that the monitoring system control unit 110 can relay received instructions to the drone 130.

Figure 2:
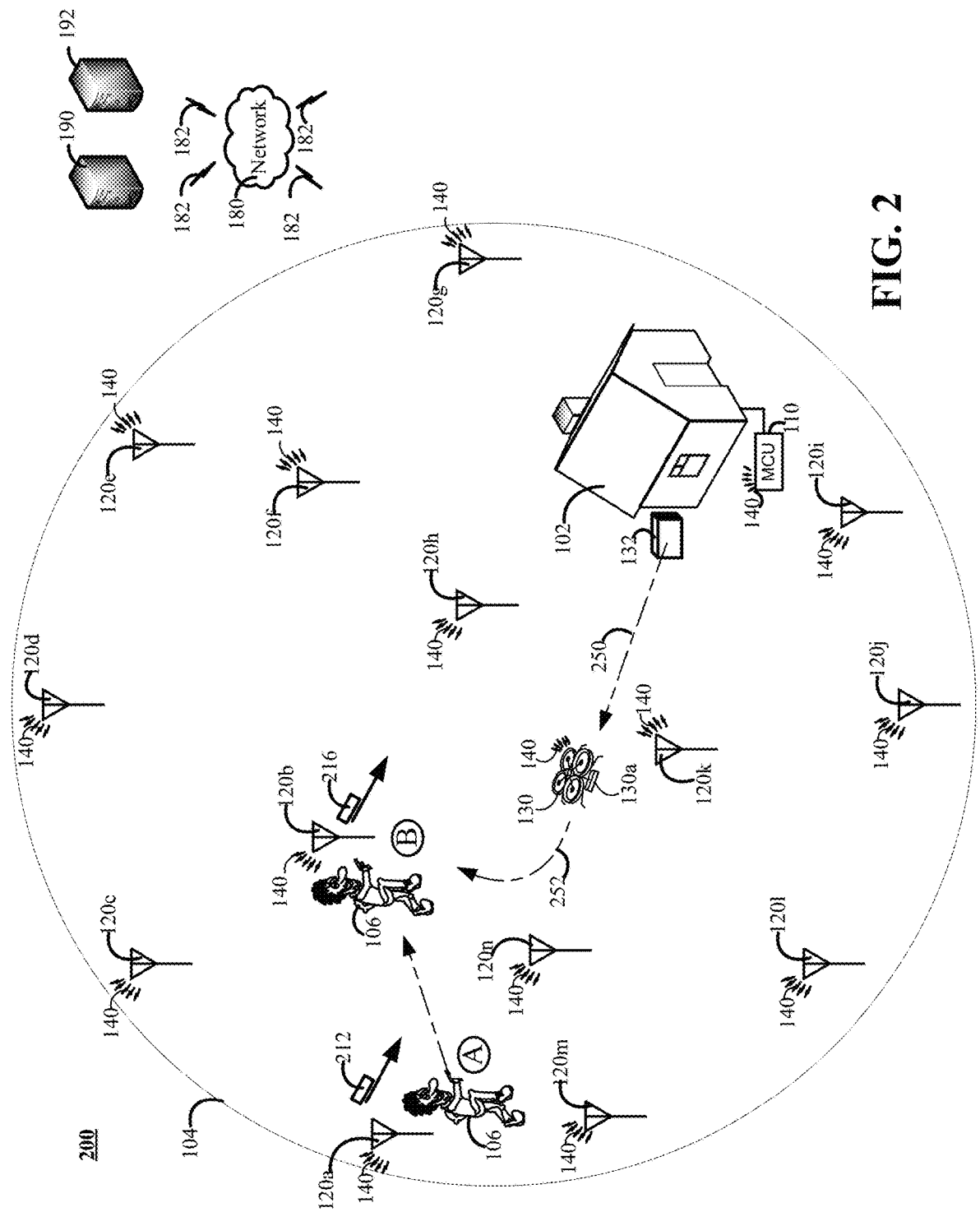
FIG. 2 is a contextual diagram of an example of monitoring system that uses a drone to monitor a parcel of land surrounding a property using drone beacons.

FIG. 2 is a contextual diagram of an example of monitoring system 200 that uses a drone 130 to monitor a parcel of land surrounding a property 102 using drone beacons 120*a*, 120*b*, 120*c*, 120*d*, 120*e*, 120*f*, 120*g*, 120*h*, 120*i*, 120*j*, 120*k*, 120*l*, 120*m*, 120*n*.

The monitoring system 200 includes the same components as the monitoring system 100. However, the monitoring system 200 is configured so that the drone 130 can communicate directly with drone beacons 120*a*, 120*b*, 120*c*, 120*d*, 120*e*, 120*f*, 120*g*, 120*h*, 120*i*, 120*j*, 120*k*, 120*l*, 120*m*, 120*n* without receiving direct instructions from a monitoring system control unit 110.

With reference to the example of FIG. 2 at stage A, a trespasser 106 may penetrate the boundary 104 of a parcel of land surrounding the property 102. A drone beacon 120*a* may detect the trespasser 106. For example, a motion sensor of the drone beacon 120*a* may detect movement by trespasser 106, a thermal sensor of the drone beacon 120*a* may detect a thermal signature associated with the trespasser 106, an audio sensor may detect noises caused by the trespasser 106, or the like. The drone beacon 120*a* may generate and broadcast sensor data 212 that is indicative of a potential event in response to the detection of the trespasser 106. The sensor data 112 may include a drone beacon identifier and data indicating that the drone beacon 120*a* has detected a potential event. The sensor data may be broadcast using the network 140. The network 140 may include one or more of a wireless LAN, a wireless WAN, a cellular network, a z-wave network, a ZigBee network, LoRa, LoRaWAN, the Internet, or a combination thereof. In some implementations, such as when the parcel of land is large (e.g., an industrial complex with 5 acre storage yards, a residential property on 25 acres, a farm on hundreds of acres, or the like) network 140 may be limited to wireless networks such as cellular networks between the drone beacon such as drone beacon 120*a* and the drone 130 that is sufficient to facilitate communication across a long expanse such as tens of acres, or more.

During stage A, the drone 130 may detect (or otherwise receive) the sensor data 212 and immediately deploy from a charging station 132 along a first navigation path 250. The first navigation path 250 may be based on a path from the drone charging station 132 to the drone beacon 120*b* that broadcast the sensor data 212. The drone 130 can determine the location of the drone beacon 120*b* using the drone beacon identifier in the sensor data 212. For example, the drone 130 may access a map of the drone beacons 120*a*, 120*b*, 120*c*, 120*d*, 120*e*, 120*f*, 120*g*, 120*h*, 120*i*, 120*j*, 120*k*, 120*l*, 120*m*, 120*n* and identify the location of the drone beacon whose identifier matches the drone beacon identifier in the sensor data 212.

Immediately deploying may include, for example, the drone 130 deploying (i) in the direction of drone beacon 120*a* and (ii) without the drone 130 "knowing" its final destination point. The drone 130 does not "know" its final destination point yet because, e.g., the trespasser 106 may still be moving at the point in time that the drone beacon 120*a* detects the trespasser 106. However, to provide the advantages of the present disclosure such as video monitoring of a parcel of land surrounding a property 102, the drone may navigate to the vicinity of the detected event as soon as practicable. Thus, the drone 130 can launch at the first detection of sensor data 212 generated by a first drone beacon 120*a*. While the drone 130 is traveling (e.g., flying through the air, driving on the ground, floating on water, or the like) along a navigation path 150, the drone 130 may continue to analyze sensor data generated by one or more drone beacons 120*a*, 120*b*, 120*c*, 120*d*, 120*e*, 120*f*, 120*g*, 120*h*, 120*i*, 120*j*, 120*k*, 120*l*, 120*m*, 120*n* provided from one or more drone 130 mounted sensors, or a combination thereof, in order to generate an adjusted flight path 152 for the drone 130.

At stage B, the trespasser 106 has moved from within the vicinity of the drone beacon 120*a* to the vicinity of the drone beacon 120*b* while the drone 130 is in the process of navigating from the drone charging station 132 along the navigation path 150 towards the drone beacon 120a. The drone beacon 120b can detect the trespasser 106. The drone beacon 120 can generate and broadcast sensor data 216 in response to the detection of the trespasser 106. The drone 130 can detect the broadcasted sensor data 216 and adjust its navigation path from a first navigation path 150 to a second navigation path 152 towards a direction where a drone beacon 120b is currently detecting a trespasser 106. The drone 130 may adjust its navigation by accessing a map of drone locations based on a drone beacon identifier obtained from the broadcast sensor data 216. For example, the drone 130 may use the obtained drone beacon identifier to retrieve location information of the drone beacon that is identified by the obtained drone beacon identifier. This method of adjusting the drone's 130 navigation path after the drone is already in route allows the drone 130 to arrive in a vicinity of a sensor 120b faster than if the drone 130 waited deploy from the charging station to drone beacon 120b until after sensor data 216 was detected.

In some implementations, multiple drone beacons 120a, 120b, 120c, 120d, 120e, 120f, 120g, 120h, 120i, 120j, 120k, 120l, 120m, 120n may be detecting movement at one time. For example, drone beacons 120a, 120b, 120n may be positioned close enough that each of the drone beacons may be detecting movement at the same time or within a predetermined amount of time of each other. In such instances, the drone 130 can use the sensor data generated from each respective drone beacon 120a, 120b, 120n to triangulate the location of the moving object, and adjust the drone's navigation path 252 to travel to the location of the detected object (as opposed to drone beacon that most recently detected movement.

In some implementations, the drone 130 may also use drone-collected data such as sensor data generated by one or more drone mounted sensors, video (or images) captured using one or more drone mounted cameras, or a combination thereof to adjust the drone's flight path. For example, as a drone 130 arrives within a predetermined distances of a drone beacon such as drone beacon 120b, the drone 130 may rely solely on the drones 130 sensors to detect an object such as a trespasser 106 within a vicinity of the drone beacon 120b.

The drone 130 may capture video of the vicinity of the drone beacon that most recently generated sensor data indicating of a potential event once the drone 130 arrives within a predetermined distance of the drone beacon. With reference to FIG. 1, for example, the drone 130 may begin using a drone-mounted camera 130a to capture video, images, or both, of the parcel of land in the vicinity of the drone beacon 120b because the drone beacon 120b is the last drone beacon to generate sensor data (e.g., sensor data 116) that is indicative of a potential event. The captured video, images, or both may be streamed back to a computer monitor, a display of a mobile device, or a storage device via the network 140 for review by a user. Alternatively, or in addition, the captured video, images, or both, can be stored in a drone-mounted storage device of the drone 130. Video, images, or both stored in a drone-mounted storage device may be uploaded to another device for viewing, storage, or both, once the drone 130 returns to the drone charging station 132. For example, the drone charging station 132 (or other device) may use a port such as a USB port to connect to the drone 130. The charging station (or other device) may download the videos, images, or both, captured by drone 130, and then provide a user with the opportunity to review the downloaded videos. Alternatively, or in addition, the video, images, or both may be downloaded from the drone to a user device using Wi-Fi 33 so that the video, images, or both, can be viewed by a user.

In some implementations, the captured video may be used by the drone 130 to further adjust the drone's 130 navigation. For example, the drone 130 may use an onboard processor to analyze the captured video for the presence of one or more objects such as a person, an animal, or the like. In some implementations, the drone 130 may be configured to use computer vision techniques to detect objects (e.g., a person, an animal, or the like) in the captured video, and then adjust the drone's 130 navigation path 252 so that the drone 130 can position itself in an orientation that is best suited to capture video, images, or both of a detected object. Adjusting the drone's navigation path 252 can include adjusting the drone's 130 direction of travel, speed of travel, or the like. Alternatively, or in addition, adjusting the drone's 130 navigation path may also include reorienting the drone 130 to put the drone 130 on an angle of approach that is better suited for capturing video of a detected object. In some implementations, the captured video may have been captured with a thermal camera, and the video can be analyzed for the presence of heat that is indicative of a person, animal, or the like. Using such techniques, the drone 130 can precisely approach and capture video of an object detected by one or more drone beacons 120a, 120b, 120c, 120d, 120e, 120f, 120g, 120h, 120i, 120j, 120k, 120l, 120m, 120n, as opposed to navigating directly to the beacon that most recently generated sensor data indicative of movement.

In the example of FIG. 2, each drone beacon 120a, 120b, 120c, 120d, 120e, 120f, 120g, 120h, 120i, 120j, 120k, 120l, 120m, 120n may be configured to directly communicate with the drone 130 via the network 140. However, the present disclosure need not be so limited. For example, in some implementations, each of the drone beacons 120a, 120b, 120c, 120d, 120e, 120f, 120g, 120h, 120i, 120j, 120k, 120l, 120m, 120n may be interconnected as a mesh network of drone beacons. In such instances, only a subset of one or more of the drone beacons may be configured to communicate with the drone 130 using network 140. In such instances, a movement detected by a perimeter drone beacon 120a may be communicated to each respective drone beacon in the mesh network of drone beacons. Then, the one or more drone beacons configured to communicate with the drone 130 can communicate data associated with the detected movement to the drone 130. The drone 130 can then adjust its navigation path based on the data received from the drone beacon.

The systems of FIGS. 1 and 2 are described as only including a single drone 130. However, the present disclosure need not be so limited. For example, in some implementations, multiple drones may be employed in a system such as monitoring systems 100 and 200. In such systems, multiple drones can be deployed to respond to sensor data broadcast by a single drone beacon. Alternatively, a single drone may be deployed to each respective beacon that is broadcasting sensor data. The multiple drone devices may be configured to communicate with each other. For example, a first drone receiving a communication from a second drone can adjust its navigation path based on the communication received from the second drone.

For example, a second drone may detect an object by analyzing images, video, or both, captured by the second drone's drone-mounted camera and determine the object's location based on the second drone's current location, the second drone's altitude, the angle of the drone's camera, or a combination thereof. The second drone may then transmit the object's location to the first drone, and the first drone can adjust the first drone's navigation path to navigate towards the object. Alternatively, the second drone may detect an object, and communicate the second drone's location to the first drone. In such instances, the first drone can adjust the first drone's navigation path to navigate towards the second drone. Other types of communications based on other drone-mounted sensor data (or drone beacon sensor data detected by a drone) may be exchanged between drones and used to adjust a particular drone's navigation path. In the aforementioned scenarios, when the drone whose flight path was adjusted arrives within a threshold distance of the adjusted location, the drone may begin using the drone's drone-mounted camera to scan the vicinity of the adjusted location for one or more objects (e.g., human persons, animals, inanimate objects, or the like).

Figure 3:
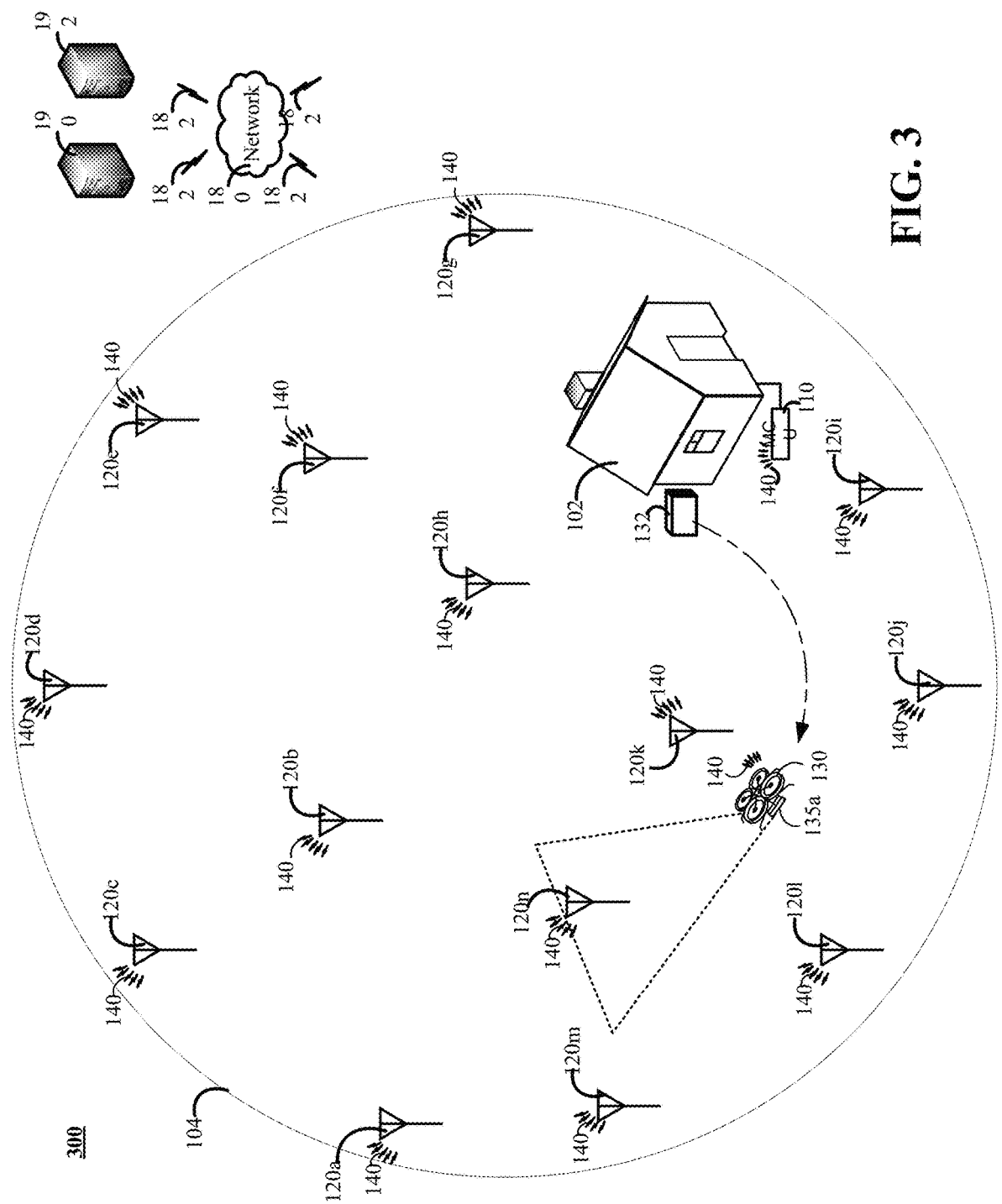
FIG. 3 is a contextual diagram of an example of a monitoring system that uses a drone to detect a location of one or more drone beacons installed through a parcel of land surrounding a property.

FIG. 3 is a contextual diagram of an example of a monitoring system 300 that uses a drone to detect a location of one or more drone beacons 120a, 120b, 120c, 120d, 120e, 120f, 120g, 120h, 120i, 120j, 120k, 120l, 120m, 120n installed through a parcel of land surrounding a property 102.

The drone 130 may receive an instruction to deploy from the drone charging station 132 and navigate through a parcel of land surrounding a property 102 in order to learn the locations of respective drone beacons 120a, 120b, 120c, 120d, 120e, 120f, 120g, 120h, 120i, 120j, 120k, 120l, 120m, 120n installed in the parcel of land surrounding the property 102. The instruction to deploy and learn the locations of respective drone beacons may come from a monitoring system control unit 110, a user device, or the drone itself (e.g., at the expiration of a predetermined amount of time for updating a drone beacon map).

The drone 130 is configured to scan the parcel of the portion of the land surrounding the property 102 to detect one or more drone beacons. In some implementations, for example, each respective drone beacon 120a, 120b, 120c, 120d, 120e, 120f, 120g, 120h, 120i, 120j, 120k, 120l, 120m, 120n may be marked with a visual indicator. The visual indicator may be capable of being detected by a drone 130 that is navigating through the parcel of land surrounding the property 102. In such instances the drone 130 can be deployed to navigate through the parcel of land surrounding the property 102, and use a camera 135a to scan the parcel of land surrounding the property 102. The drone 130 can detect each respective drone beacon installed in the parcel of land surrounding the property 102, use one or more onboard drone sensors (e.g., a GPS unit) to determine a location associated with the location of each respective drone beacon, and then store location data (e.g., GPS location data) and a drone beacon identifier. The stored location data and drone beacon identifier for each respective drone beacon can be used to generate a map of the drone beacons installed in the parcel of land surrounding the property 102.

In some implementations, the aforementioned process may be performed to initially configured a drone 130 to learn the locations of the drone beacons 120a, 120b, 120c, 120d, 120e, 120f, 120g, 120h, 120i, 120j, 120k, 120l, 120m, 120n at the time of initial installation of the drone beacons. Alternatively, the aforementioned process may be performed to verify or update an existing map of drone beacon locations. For example, the drone 130 can navigate a throughout the parcel of land surrounding the property 102 to determine whether one or more drone beacons have been moved from their prior locations, whether one or more new drone beacons have been added, or whether one or more drone beacons have been removed.

Alternatively, or in addition, each drone beacon 120a, 120b, 120c, 120d, 120e, 120f, 120g, 120h, 120i, 120j, 120k, 120l, 120m, 120n may be equipped with a GPS unit. In such instances, each respective drone beacon can be configured to obtain the drone beacon's GPS location and broadcast the drone beacon's location and a drone beacon identifier via the network 140. In such instances, the drone 130 can detect and store the broadcasted location and drone beacon identifier. The stored location and beacon identifier for each drone beacon may be used to generate a map of drone beacons installed in the parcel of land surrounding the property 102.

Figure 4:
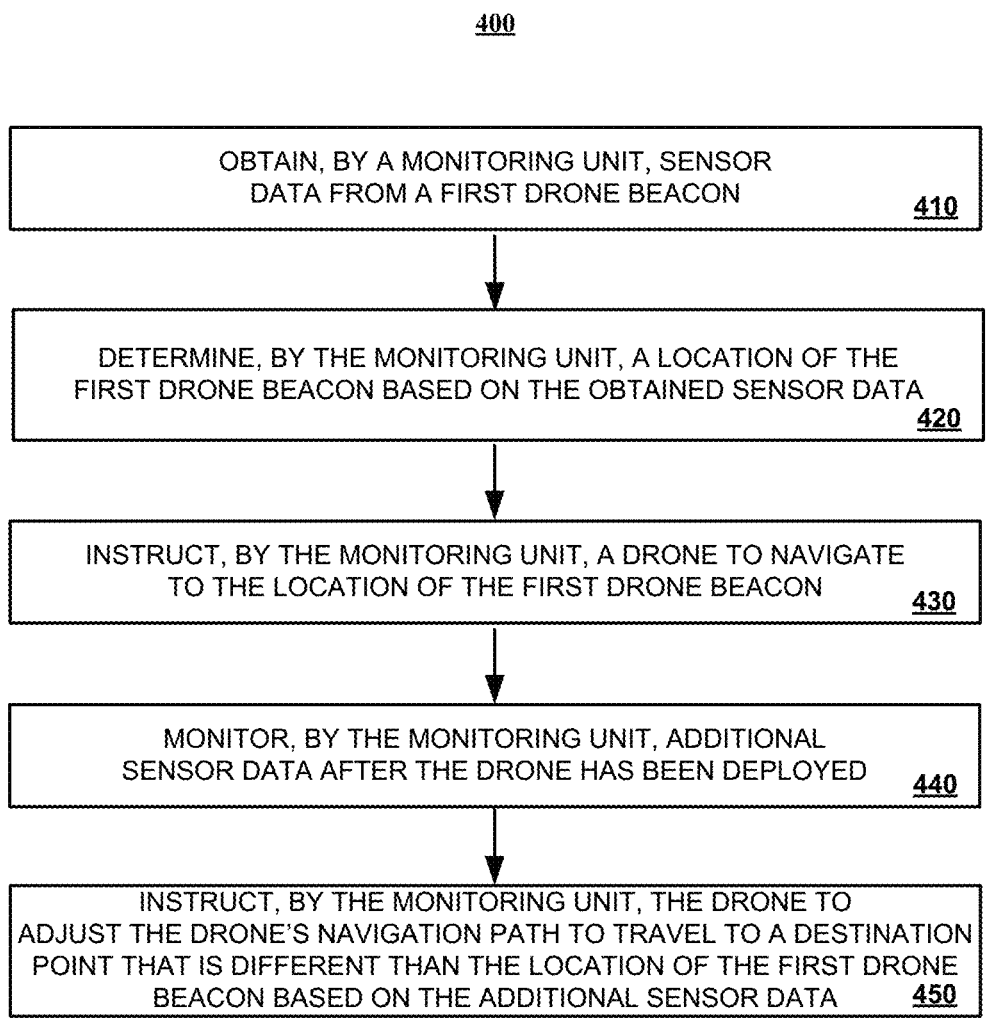
FIG. 4 is a flowchart of an example of a process for using a monitoring system to monitor a parcel of land surrounding a property using drone beacons.

FIG. 4 is a flowchart of an example of a process 400 for using a monitoring system to monitor a parcel of land surrounding a property using drone beacons. Generally, the process 400 may include obtaining, by a monitoring unit, sensor data from a first drone beacon (410), determining, by the monitoring unit, a location of the first drone beacon based on the obtained sensor data (420), instructing, by the monitoring unit, a drone to navigate to the location of the first drone beacon (430), monitoring, by the monitoring unit, presence of additional sensor data broadcast by one or more component devices of the monitoring system after the drone has been deployed (440), and instructing, by the monitoring unit, the drone to adjust the drone's navigation path to travel to a destination point that is different than the location of the first drone beacon based on the additional sensor data acquired at stage 440 (450). For convenience, the process 400 will be described as being performed by a monitoring unit such as a monitoring system control unit 110 or a monitoring application server 190 described with reference to system 100 of FIG. 1. Alternatively, in some implementations, each stage of process 400 may be performed by any component of a monitoring system such as the system 100.

In more detail, the monitoring unit may begin performing the process 400 by obtaining 410 sensor data from a first drone beacon. For example, the monitoring unit may detect sensor data that is broadcast by a drone beacon. The broadcast sensor data may include a drone beacon identifier, a drone beacon location, or both. In some implementations, monitoring unit may obtain the sensor data directly from the first drone beacon. Alternatively, in other implementations, the sensor data from the first drone beacon may be relayed to the monitoring unit from a different drone beacon of a mesh of drone beacons that is configured to communicate with the monitoring unit.

The monitoring unit may determine 420 the location of the first drone beacon based on the obtained sensor data. For example, the monitoring unit can extract the location of the first drone beacon from the sensor data that is obtained from the first drone beacon. Alternatively, the monitoring unit can extract a drone beacon identifier from the sensor data that is obtained from the first drone beacon, and then use the drone beacon identifier to determine a location of the first drone beacon. For example, monitoring unit can use the drone beacon identifier to search a map of drone beacon locations for the location of the first drone beacon.

The monitoring unit may instruct 430 a drone to navigate to the location of the first drone beacon. In some implementations, the instruction may instruct the drone to deploy from a drone charging station. In response to receiving the instruction transmitted at stage 430, the drone may deploy from the charging station and begin navigating towards the location associated with the first drone beacon. The drone may deploy from the charging station by flying towards the location of the first drone beacon, rolling (or otherwise traveling on ground) towards the location of the first drone beacon, or floating towards the location of the first beacon.

In some implementations, the instruction transmitted at stage 430 may include an identifier that identifies the first drone beacon, a location of the first drone beacon, or a combination thereof. When the instruction includes only an identifier of the first drone beacon, the drone may access a map of the parcel of land surrounding the property that includes a marker for each drone beacon. Each marker may be associated with marker data that identifies a drone particular beacon identifier and a particular drone beacon location. The drone can then use the identifier of the first drone beacon to search the marker data for each drone beacon marker in the map to obtain the location of the first drone beacon. The drone can then plot a navigation path to the first drone beacon using the map of the parcel of land surrounding the property.

When the instruction includes an identifier of the first drone beacon and a location of the first drone beacon, the drone may access a map of the parcel of land surrounding the property, plot the received location of the first drone beacon on the map. The drone can then navigate to the location of the first drone beacon using the map.

The monitoring unit can monitor 440 for the presence of additional sensor data broadcast by one or more component devices of the monitoring system after the drone has been deployed. For example, the monitoring unit can obtain and process sensor data generated by one or more component devices of the monitoring system such as one or more second drone beacons that is broadcast after the drone is instructed to deploy at stage 430 towards a first drone beacon. Other types of component devices may include, for example, a motion sensor configured to detect moving objects, a camera configured to capture images, one or more sensors mounted to a drone configured to detect movement, one or more cameras (or other sensors) mounted to a drone to detect heat signatures, or the like. In some implementations, the additional sensor data may only include a drone beacon identifier, a drone beacon location, or both, for the second drone beacon that has detected the presence of an object. In other implementations, the additional sensor data may include a drone beacon identifier, a drone beacon location, or both, from multiple respective second drone beacons that are each detecting movement. In such instances, the monitoring unit can process the additional sensor data to triangulate the location of an object moving between the multiple second drone beacons.

In some implementations, the one or more component devices may only generate additional sensor data if a set of specific criteria are met. For example, a component device such as a second drone beacon may only generate additional sensor data indicative of a moving object if movement is detected by the second drone beacon and the first drone beacon is no longer detecting movement. In such instances, detection of movement by the second drone beacon and no detection of movement by the first drone beacon may indicate that a moving object has moved from the location of the first drone beacon to the location of the second drone beacon. Similar sets of criteria that limit, to specific circumstances, when a component device will generate, transmit, or both, additional sensor data may be employed for other types of component devices such as cameras or drone. In some implementations, additional sensor data may be generated by the component device in all instances where an event such as movement of an object is detected, and then only broadcasted for detection by a monitoring unit when a set of specific criteria is satisfied (e.g., movement at a component device and not movement at a first drone beacon). In other implementations, the component device may generate and transmit sensor data whenever an event is detected independent of any set of criteria.

In some implementations, the component device such as a drone may be configured to generate and broadcast additional sensor data to the monitoring unit for processing. For example, the monitoring unit can process videos or images streamed from a drone camera to detect objects (e.g., one or more persons, one or more animals, or other foreign objects) in the videos or images. The monitoring unit may detect objects in the video or images using computer vision techniques to identify objects in the video or images. Alternatively, or in addition, the drone may stream video or images captured using a thermal camera. In such instances, the monitoring unit can identify objects in the video or images based on the heat signature of the object falling within the range of living objects such as a person or animal. Once an object is identified, the monitoring unit can analyze the streamed video or images to determine the location of the object.

The monitoring unit can instruct 450 the drone to adjust the drone's navigation path to travel to a destination point that is different than the location of the first drone beacon based on the additional sensor data acquired at stage 440. For example, the monitoring unit can instruct the drone to adjust the drone's navigation path to navigate towards a second drone beacon. Alternatively, or in addition, the monitoring unit can instruct the drone to adjust its navigation path to navigate towards a destination point that is determined by triangulating the locations of sensor data received from multiple different second drone beacons. Alternatively, or in addition, the monitoring unit can instruct the drone to adjust its navigation path to navigate towards a destination point that is based on video analysis, image analysis, or both, of video or images captured by one or more drone-mounted cameras.

The drone may capture video, images, or both, that can be streamed back to the monitoring unit for review analysis of a potential event associated with the destination point. In some implementations, the drone may navigate within a predetermined distance of the destination point for at least a predetermined period of time to capture video of the vicinity of the destination point. In some implementations, the drone may return to the drone charging station at the expiration of a predetermined period of time unless an object is detected. If an object is detected, the drone may continue to capture video of the object until other instructions are received from the monitoring unit.

If it is determined that the object is a person, the drone may engage the person and perform one or more monitoring operations. For example, the drone may capture images of the person's face and perform facial recognition analysis. Alternatively, or in addition, the drone may establish an input/output interface using a camera, speaker, and microphone that allows a person who is a legitimate occupant of the property 102 to communicate with the person and receive communications from the person using audio communication, video communication, or the like. In some implementations, the communication may be a live interaction between the property occupant and the detected person. In other implementations, the communication may be a predetermined recording that the person is on private property and should leave before the authorities are called. In some implementations, the drone may playback loud audio, bright lights, or a combination thereof to scare the person away. In some implementations, the drone may also use an electric shock device to shock the person in an effort to scare the person away from the parcel of land surrounding the property or to temporarily disable the person until authorities arrive. In some implementations, the drone may equipped with a device that can spray a person with a dye that can be used to identify an individual if the individual was caught later. The dye may be visible or invisible to the human eye. For example, the dye may be an invisible dye in sunlight but when exposed to one or more particular types of light, the dye may later become visible to the human eye. Alternatively, the dye may be a form of paint, ink, or the like that is always visible to the human eye in sunlight when applied to a human person. In some implementations, the drone may swarm the person in an effort to scare the person away.

If it is determined that the object is an animal, the drone may take one or more actions to scare the animal away. For example, the drone may play loud audio, shine bright lights, or a combination thereof to scare the animal away. The drone my also use a Taser to shock the animal in an effort to scare the animal away from the parcel of land surrounding the property. In some implementations, the drone may swarm the animal in an effort to scare the animal away.

Figure 5:
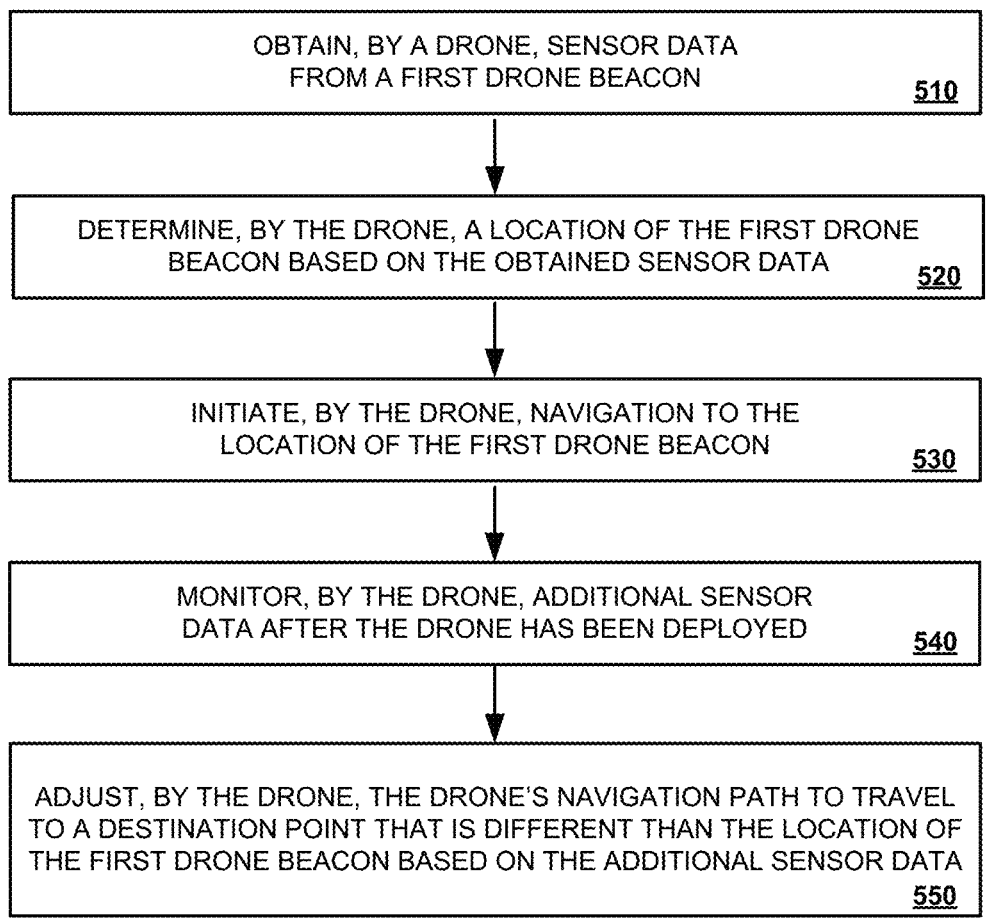
FIG. 5 is a flowchart of an example of a process using a drone to monitor a parcel of land surrounding a property using drone beacons.

FIG. 5 is a flowchart of an example of a process 500 using a drone to monitor a parcel of land surrounding a property using drone beacons. Generally, the process 500 includes obtaining, by a drone, sensor data from a first drone beacon (510), determining, by the drone, a location of the first drone beacon based on the obtained sensor data (520), initiating, by the drone, navigation to the location of the first drone beacon (530), monitoring, by the drone, additional sensor data after the drone has been deployed (540), and adjusting, by the drone, the drone's navigation path to travel to a destination point that is different than the location of the first drone beacon based on the additional sensor data acquired at stage 540 (550). For convenience, the process 500 will be described as being performed by a drone such as a drone 130 described with reference to FIGS. 1-3.

In more detail, the drone may begin performing the process 500 by obtaining 510 sensor data from a first drone beacon. For example, the drone may detect sensor data that is broadcast by a drone beacon. The broadcast sensor data may include a drone beacon identifier, a drone beacon location, or both. In some implementations, the drone may obtain the sensor data directly from the first drone beacon. Alternatively, in other implementations, the sensor data from the first drone beacon may be relayed to the drone from a different drone beacon of a mesh of drone beacons that is configured to communicate with the drone.

The drone may determine 520 the location of the first drone beacon based on the obtained sensor data. For example, the drone can extract the location of the first drone beacon from the sensor data that is obtained from the first drone beacon. Alternatively, the drone can extract a drone beacon identifier from the sensor data that is obtained from the first drone beacon, and then use the drone beacon identifier to determine a location of the first drone beacon. For example, drone can use the drone beacon identifier to search a map of drone beacon locations for the location of the first drone beacon.

The drone may initiate 530 navigation to the location of the first drone beacon. Initiating navigation to the location of the first drone beacon may include, for example, the drone deploying from a drone charging station. In some implementations, the drone may deploy from the charging station and begin navigating towards the location associated with the first drone beacon in response to determining the location of the first drone beacon at stage 520. The drone may deploy from the charging station by flying towards the location of the first drone beacon, rolling (or otherwise traveling on ground) towards the location of the first drone beacon, or floating towards the location of the first beacon.

The drone may be configured to determine a navigation path to the first drone beacon. For example, when the obtained sensor data includes only an identifier of the first drone beacon, the drone may access a map of the parcel of land surrounding the property that includes a marker for each drone beacon. Each marker may be associated with marker data that identifies a drone particular beacon identifier and a particular drone beacon location. The drone can then use the identifier of the first drone beacon to search the marker data for each drone beacon marker in the map to obtain the location of the first drone beacon. The drone can then plot a navigation path to the first drone beacon using the map of the parcel of land surrounding the property.

In other instances, when the obtained sensor data includes an identifier of the first drone beacon and a location of the first drone beacon, the drone may access a map of the parcel of land surrounding the property, plot the received location of the first drone beacon on the map. The drone can then navigate to the location of the first drone beacon using the map.

The drone can monitor 540 additional sensor data after the drone has been deployed. For example, the drone can obtain and process sensor data generated by one or more second drone beacons that is broadcast after the drone deploys at stage 530 towards a first drone beacon. In some implementations, the additional sensor data may only include a drone beacon identifier, a drone beacon location, or both, for the second drone beacon that has detected the presence of an object. In other implementations, the additional sensor data may include a drone beacon identifier, a drone beacon location, or both, from multiple respective second drone beacons that are each detecting movement. In such instances, the drone can process the additional sensor data to triangulate the location of an object moving between the multiple second drone beacons.

Alternatively, or in addition, the drone can obtain and process sensor data from one or more drone-mounted sensors, drone-mounted cameras, or a combination thereof. For example, the drone can process videos or images captured by a drone-mounted camera to detect objects (e.g., one or more persons, one or more animals, or other foreign objects) in the videos or images. The drone may detect objects in the video or images using computer vision techniques to identify objects in the video or images. Alternatively, or in addition, the drone analyze video, images, or both captured using a thermal camera. In such instances, the drone can identify objects in the video or images based on the heat signature of the object falling within the range of living objects such as a person or animal. Once an object is identified, the drone can analyze the captured video or images to determine the location of the object. Alternatively, the drone can use one or more other sensors such as IR sensors to determine the location of the detected object.

The drone can adjust 550 the drone's navigation path to travel to a destination point that is different than the location of the first drone beacon based on the additional sensor data acquired at stage 540. For example, the drone can adjust the drone's navigation path to navigate towards a second drone beacon. Alternatively, or in addition, the drone can adjust its navigation path to navigate towards a destination point that is determined by triangulating the locations of sensor data received from multiple different second drone beacons. Alternatively, or in addition, the drone can adjust its navigation path to navigate towards a destination point that is based on on-board video analysis, image analysis, or both, of video or images captured by one or more drone-mounted cameras.

The drone may capture video, images, or both, that can be streamed back to the monitoring unit for review analysis of a potential event associated with the destination point. In some implementations, the drone may navigate within a predetermined distance of the destination point for at least a predetermined period of time to capture video of the vicinity of the destination point. In some implementations, the drone may return to the drone charging station at the expiration of a predetermined period of time unless an object is detected. If an object is detected, the drone may continue to capture video of the object until other instructions are received from the monitoring unit.

If it is determined that the object is a person, the drone may engage the person and perform one or more monitoring operations. For example, the drone may capture images of the person's face and perform facial recognition analysis. Alternatively, or in addition, the drone may establish an input/output interface using a camera, speaker, and microphone that allows a person who is a legitimate occupant of the property 102 to communicate with the person and receive communications from the person using audio communication, video communication, or the like. In some implementations, the communication may be live interaction between the property occupant and the detected person. In other implementations, the communication may be a predetermined recording that the person is on private property and should leave before the authorities are called. In some implementations, the drone may playback loud audio, bright lights, or a combination thereof to scare the person away. The drone my also use a Taser to shock the person in an effort to scare the person away from the parcel of land surrounding the property or to temporarily disable the person until authorities arrive. In some implementations, the drone may swarm the person in an effort to scare the person away.

If it is determined that the object is an animal, the drone may take one or more actions to scare the animal away. For example, the drone may play loud audio, shine bright lights, or a combination thereof to scare the animal away. The drone my also use a Taser to shock the animal in an effort to scare the animal away from the parcel of land surrounding the property. In some implementations, the drone may swarm the animal in an effort to scare the animal away.

Figure 6:
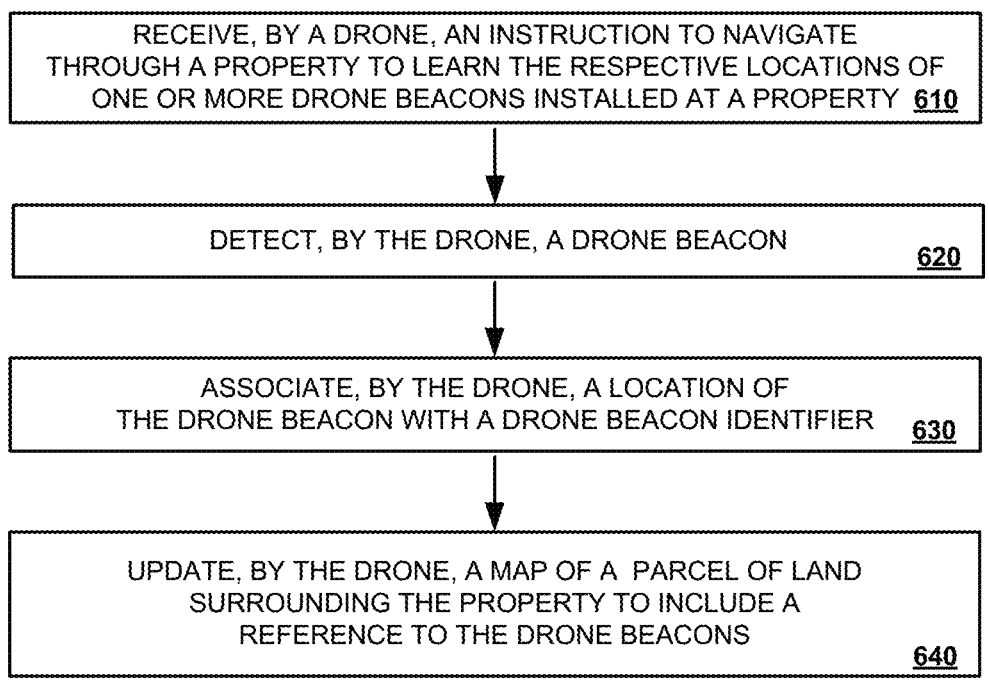
FIG. 6 is a flowchart of a process for using a drone to detect the location of one or more drone beacons installed a parcel of land surrounding a property.

FIG. 6 is a flowchart of a process 600 for using a drone to detect the location of one or more drone beacons installed a parcel of land surrounding a property. Generally, the process 600 includes receiving, by a drone, an instruction to navigate through a property to learn the respective locations of one or more drone beacons installed at a property (610), detecting, by the drone, a drone beacon (620), associating, by the drone, a location of the drone beacon with a drone beacon identifier (630), and update a map of the parcel of land surrounding the property to include a reference to the drone beacon (640). For convenience, the process 600 will be described as being performed by a drone such as a drone 130 described with reference to FIGS. 1-3.

In more detail, a drone can begin performance of the process 600 by receiving 610 an instruction to navigate through a property to learn the respective locations of one or more drone beacons installed at a property. In some implementations, the instruction may be received from a monitoring unit such as a monitoring system control unit, a monitoring application server, or the like. Alternatively, the instruction may be received from an internal unit, module, or the like of the drone itself.

In either scenario, generation and transmission of the received instruction may be triggered in a number of ways. For example, the instruction may be periodically generated. In such instances, the instruction to navigate through the property to learn the respective locations of one or more drone beacons installed at the property may be periodically generated in response to the expiration of a predetermined amount of time such as weekly, monthly, or the like. Alternatively, or in addition, the instruction may be generated and transmitted in response to an instruction from a user to navigate through the property to learn the respective locations of one or more drone beacons installed at the property. For example, a user may instruct the drone to perform the operation of stage 610 at time of first installation of the drone beacons in a parcel of land surrounding the property so that the drone can learn the locations of the installed drone beacons. Alternatively, the user can instruct to perform the operation of stage 610 in between periods of time established for periodic learning of drone beacon locations described above. The drone may deploy from a drone charging station in response to the instruction received at stage 610.

The drone can detect 620 a drone beacon. For example, drone may use one or more drone-mounted cameras, one or more drone-mounted sensors, or a combination thereof to detect the drone beacon. Each drone beacon installed in a parcel of land that surrounds the property may be marked with a visual indicator such as a distinctive color, a reflector, a mirror, one or more lights, one or more visible light communication (VLC) lights, or the like. By way of example, the drone may use a drone-mounted camera to detect visual indicators such as a color, reflector, mirror, or lights associated with the drone beacon. Alternatively, for example, the drone can use one or more VLC sensors to detect VLC lights output by the drone beacon.

In other implementations, a drone beacon may not be associated with any visual markers. In such instances, the drone may use one or more drone-mounted sensors to detect a drone beacon based on data that is being broadcast by the drone beacon. For example, a drone beacon may be configured to broadcast data using one or more RF frequencies. The broadcasted data may include a drone beacon identifier, a location (e.g., GPS location) of a drone beacon identifier, or a combination thereof. In such instances, the drone can use one or more onboard RF receivers to detect the data broadcasted from the drone beacon.

The drone can associate 630 a location of the drone beacon with a drone beacon identifier. For example, upon detection of the drone beacon using one or more drone-mounted cameras, one or more drone mounted sensors, or a combination thereof, the drone can determine a location of the detected drone beacon. For example, when the drone visually detects the drone beacon using one or more drone-mounted cameras, the drone can navigate to a position that is directly above the detected drone beacon and determine the GPS location of the detected drone beacon. The drone can generate a drone beacon identifier for the detected drone beacon and store the generated drone beacon identifier with the drone's location.

Alternatively, or in addition, the drone may determine the location of the drone beacon without positioning the drone over the drone beacon. For example, the drone may determine the location of a drone beacon detected by a drone-mounted camera by calculating the difference between the drone's current location and the drone beacon. The drone may calculate the difference between the drone's current location and the drone beacon location as a function of parameters that include one or more of the position of the drone beacon in an image captured by the drone-mounted camera, the angle of the drone-mounted camera when the drone-mounted camera snapped the picture, and the altitude of the drone when the image of the drone beacon was captured by the drone-mounted camera. Once the drone determines the drone's distance from the drone beacon, the drone may calculate the drone beacon's GPS location based on (i) the GPS position of the drone itself and (ii) the drone's distance from the drone beacon. In such instances, the drone can associate the calculated GPS location for the drone beacon with a particular drone beacon identifier.

Alternatively, or in addition, the drone may detect data broadcast by a detected drone beacon across one or more RF frequencies. In some implementations, the broadcasted data may include a drone beacon location, a drone beacon identifier, or both. If the broadcasted data includes a drone beacon location and drone beacon identifier, the drone may associate and store the detected drone beacon location and drone beacon identifier. Alternatively, if the broadcasted data includes a drone beacon location and not a drone beacon identifier, then the drone may generate a drone beacon identifier that can be associated with the detected drone beacon location, and store the associated drone beacon identifier and the detected drone beacon location.

The drone can use the associated drone beacon location and drone beacon identifier of stage 630 to update a map of the parcel of land surrounding the property to include a reference to the drone beacon. For example, the drone can add a marker for the detected drone beacon to the map of the parcel of land surrounding the property. The marker may include data identifying the drone beacon, data that describes the drone beacon's location, or a combination thereof. The drone can use the updated to map to navigate to one or more drone beacons given information identifying the drone beacon.

Figure 7:
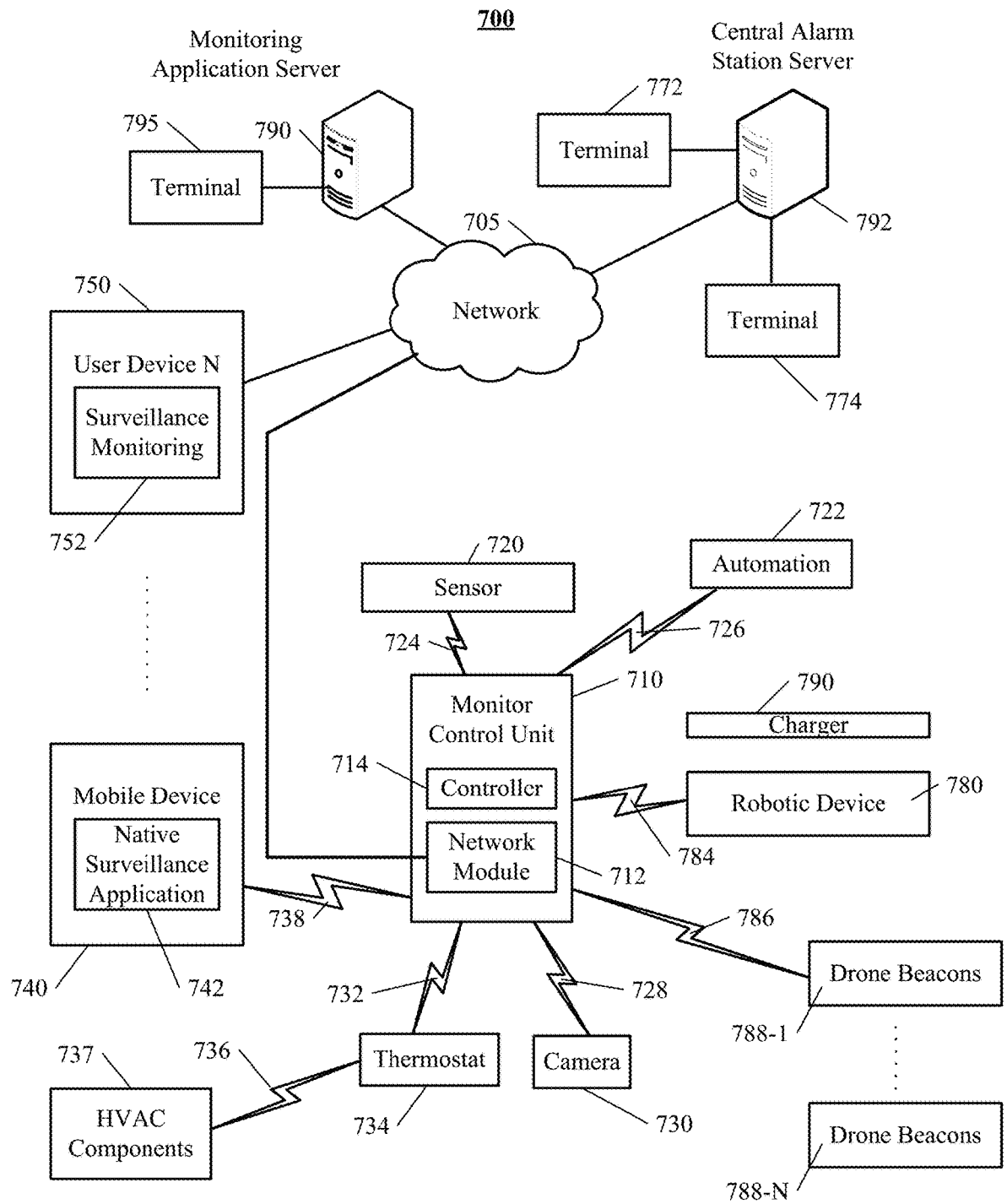
FIG. 7 is a block diagram of components that can be used to monitoring a parcel of land surrounding a property using drone beacons.

FIG. 7 is a block diagram of components that can be used to monitoring a parcel of land surrounding a property using drone beacons.

The electronic system 700 includes a network 705, a monitoring system control unit 710, one or more user devices 740, 750, a monitoring application server 790, and a central alarm station server 770. In some examples, the network 705 facilitates communications between the monitoring system control unit 710, the one or more user devices 740, 750, the monitoring application server 790, and the central alarm station server 770.

The network 705 is configured to enable exchange of electronic communications between devices connected to the network 705. For example, the network 705 may be configured to enable exchange of electronic communications between the monitoring system control unit 710, the one or more user devices 740, 750, the monitoring application server 790, and the central alarm station server 770. The network 705 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 705 may include multiple networks or subnetworks, each of which may include, for example, a wired or wireless data pathway. The network 705 may include a circuit-switched network, a packet-switched data network, or any other network able to carry electronic communications (e.g., data or voice communications). For example, the network 705 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 705 may include one or more networks that include wireless data channels and wireless voice channels. The network 705 may be a wireless network, a broadband network, or a combination of networks including a wireless network and a broadband network.

The monitoring system control unit 710 includes a controller 712 and a network module 714. The controller 712 is configured to control a monitoring system (e.g., a home alarm or security system) that includes the monitoring system control unit 710. In some examples, the controller 712 may include a processor or other control circuitry configured to execute instructions of a program that controls operation of an alarm system. In these examples, the controller 712 may be configured to receive input from sensors, detectors, or other devices included in the alarm system and control operations of devices included in the alarm system or other household devices (e.g., a thermostat, an appliance, lights, etc.). For example, the controller 712 may be configured to control operation of the network module 714 included in the monitoring system control unit 710.

The network module 714 is a communication device configured to exchange communications over the network 705. The network module 714 may be a wireless communication module configured to exchange wireless communications over the network 705. For example, the network module 714 may be a wireless communication device configured to exchange communications over a wireless data channel and a wireless voice channel. In this example, the network module 714 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 714 also may be a wired communication module configured to exchange communications over the network 705 using a wired connection. For instance, the network module 714 may be a modem, a network interface card, or another type of network interface device. The network module 714 may be an Ethernet network card configured to enable the monitoring system control unit 710 to communicate over a local area network and/or the Internet. The network module 714 also may be a voiceband modem configured to enable the alarm panel to communicate over the telephone lines of Plain Old Telephone Systems (POTS).

The monitoring system that includes the monitoring system control unit 710 includes at least one sensor (or detector) 720. The sensor 720 may include a contact sensor, a motion sensor, a glass break sensor, or any other type of sensor included in an alarm system or security system. The sensor 720 may also include an environmental sensor, such as a temperature sensor, a water sensor, a rain sensor, a wind sensor, a light sensor, a smoke detector, a carbon monoxide detector, an air quality sensor, etc. The sensor 720 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensor 720 may include a radio-frequency identification (RFID) sensor that identifies a particular article that includes a pre-assigned RFID tag. Each respective type of sensor (or detector) 720 is configured to generate data which can be used to detect a potential event at a property.

The monitoring system control unit 710 communicates with the module 725 and the camera 730 to perform surveillance or monitoring. The module 725 is connected to one or more devices that enable home automation control. For instance, the module 725 may be connected to one or more lighting systems and may be configured to control operation of the one or more lighting systems. Also, the module 725 may be connected to one or more electronic locks at the property and may be configured to control operation of the one or more electronic locks (e.g., control Z-Wave locks using wireless communications in the Z-Wave protocol. Further, the module 725 may be connected to one or more appliances at the property and may be configured to control operation of the one or more appliances. The module 725 may include multiple modules that are each specific to the type of device being controlled in an automated manner. The module 725 may control the one or more devices based on commands received from the monitoring system control unit 710. For instance, the module 725 may cause a lighting system to illuminate an area to provide a better image of the area when captured by a camera 730.

The monitoring system control unit 710 may be configured to monitor a parcel of land surrounding a property based on sensor data detected from one or more drone beacons 788-1 to 788-N that are installed in the parcel of land surrounding the property. In some implementations, the monitoring system control unit 710 may be configured to communicate (e.g., detect broadcast sensor data from) with each of the one or more drone beacons 788-1 to 788-N directly. Alternatively, the monitoring system control unit 710 is configured to communication with one or more drone beacons of a plurality of drone beacons configured as mesh network of drone beacons 788-1 to 788-N that are closest in proximity to the monitoring system control unit 710. The monitoring system control unit 710 can be configured to perform the operations described with reference to the monitoring system control unit 110 (or other monitoring units) of FIGS. 1-6.

The camera 730 may be a video/photographic camera or other type of optical sensing device configured to capture images. For instance, the camera 730 may be configured to capture images of an area within a building monitored by the monitoring system control unit 710. The camera 730 may be configured to capture single, static images of the area and also video images of the area in which multiple images of the area are captured at a relatively high frequency (e.g., thirty images per second). The camera 730 may be controlled based on commands received from the monitoring system control unit 710.

The camera 730 may be triggered by several different types of techniques. For instance, a Passive Infra Red (PIR) motion sensor may be built into the camera 730 and used to trigger the camera 730 to capture one or more images when motion is detected. The camera 730 also may include a microwave motion sensor built into the camera and used to trigger the camera 730 to capture one or more images when motion is detected. The camera 730 may have a "normally open" or "normally closed" digital input that can trigger capture of one or more images when external sensors (e.g., the sensor 720, PIR, door/window, etc.) detect motion or other events. In some implementations, the camera 730 receives a command to capture an image when external devices detect motion or another potential alarm event. The camera 730 may receive the command from the controller 712 or directly from one of the sensor 720.

In some examples, the camera 730 triggers integrated or external illuminators (e.g., Infra Red, Z-wave controlled "white" lights, lights controlled by the module 725, etc.) to improve image quality when the scene is dark. An integrated or separate light sensor may be used to determine if illumination is desired and may result in increased image quality.

The camera 730 may be programmed with any combination of time/day schedules, system "arming state", or other variables to determine whether images should be captured or not when triggers occur. The camera 730 may enter a low-power mode when not capturing images. In this case, the camera 730 may wake periodically to check for inbound messages from the controller 712. The camera 730 may be powered by internal, replaceable batteries if located remotely from the monitoring system control unit 710. The camera 730 may employ a small solar cell to recharge the battery when light is available. Alternatively, the camera 730 may be powered by the controller's 712 power supply if the camera 730 is co-located with the controller 712.

In some implementations, the camera 730 communicates directly with the monitoring application server 790 over the Internet. In these implementations, image data captured by the camera 730 does not pass through the monitoring system control unit 710 and the camera 730 receives commands related to operation from the monitoring application server 790.

The system 700 also includes a thermostat 734 to perform dynamic environmental control at the property. The thermostat 734 is configured to monitor temperature and/or energy consumption of an HVAC system associated with the thermostat 734, and is further configured to provide control of environmental (e.g., temperature) settings. In some implementations, the thermostat 734 can additionally or alternatively receive data relating to activity at a property and/or environmental data at a property, e.g., at various locations indoors and outdoors at the property. The thermostat 734 can directly measure energy consumption of the HVAC system associated with the thermostat, or can estimate energy consumption of the HVAC system associated with the thermostat 734, for example, based on detected usage of one or more components of the HVAC system associated with the thermostat 734. The thermostat 734 can communicate temperature and/or energy monitoring information to or from the monitoring system control unit 710 and can control the environmental (e.g., temperature) settings based on commands received from the monitoring system control unit 710.

In some implementations, the thermostat 734 is a dynamically programmable thermostat and can be integrated with the monitoring system control unit 710. For example, the dynamically programmable thermostat 734 can include the monitoring system control unit 710, e.g., as an internal component to the dynamically programmable thermostat 734. In addition, the monitoring system control unit 710 can be a gateway device that communicates with the dynamically programmable thermostat 734.

A module 737 is connected to one or more components of an HVAC system associated with a property, and is configured to control operation of the one or more components of the HVAC system. In some implementations, the module 737 is also configured to monitor energy consumption of the HVAC system components, for example, by directly measuring the energy consumption of the HVAC system components or by estimating the energy usage of the one or more HVAC system components based on detecting usage of components of the HVAC system. The module 737 can communicate energy monitoring information and the state of the HVAC system components to the thermostat 734 and can control the one or more components of the HVAC system based on commands received from the thermostat 734.

The system 700 can include one or more drone beacons 788-1 to 788-N (where "N" is any non-zero integer). Each respective drone beacon 788-1 to 788-N may include one or more sensors, a power unit, and a communications unit. The sensors may include one or more infrared motion sensors. The power unit may include one or more batteries, a solar panel, or a combination thereof. In some implementations, the solar panel may be used to charge the one or more batteries during periods of sunlight. The communications unit may include a network interface that facilitates communication using one or more RF frequencies. In some implementations, the communication unit may facilitate using cellular communications module such as an M2M communications module.

Each drone beacon 788-1 to 788-N can be configured to generate sensor data in response to the detection of a potential event by the one or more drone beacon sensors. In some implementations, the communication unit of the drone beacons may be configured to broadcast the sensor data over large ranges (e.g., tens of acres, hundreds of acres, or the like) using cellular communications. Alternatively, in some implementations, the drone beacons 788-1 to 788-N may be configured to as a mesh network so that each respective drone beacon 788-1 to 788-N communications with each other. Then, only a subset of the one or more drone beacons 788-1 to 788-N that is closest in proximity to a monitoring control unit 710 or a robotic device 780 can be used to communicate data indicative of a potential event detected by one drone beacon of the drone beacons 788-1 to 788-N.

Each drone beacon 788-1 to 788-N may be, for example, staked into the ground of the parcel of land surrounding the property. In some implementations, the drone beacons 788-1 to 788-N may be installed around the perimeter of the parcel of land that surrounds the property, scattered through the parcel of land at a variety of distances between the boundary line of the parcel of land and the property, or a combination thereof.

The drone beacons 788-1 to 788-N may be rugged to ensure continued and reliable functionality in all different types of weather environments. The drone beacons 788-1 to 788-N may come in a variety of different shapes and sizes with no restrictions. However, in some implementations, the drone beacons 788-1 to 788-N may be the size of, e.g., a shotgun shell. This can allow the drone beacons 788-1 to 788-N to be installed through a parcel of land that surrounds the property without being an eye-sore. Each drone beacon 788-1 to 788-N may be configured to be staked into the ground or mounted to a tree, telephone pole, or other object in the parcel of land surrounding the property.

The system 700 further includes one or more robotic devices 780. The robotic device 780 may be any type of robot that is capable of moving and taking actions that assist in security monitoring. For example, the robotic device 780 may include a drone that is capable of moving throughout a property based on automated control technology and/or user input control provided by a user. In this example, the drone may be able to fly, roll, walk, or otherwise move about the property. The drone may include a helicopter type device (e.g., a quad copter), rolling helicopter type device (e.g., a roller copter device that can fly and also roll along the ground, walls, or ceiling) and a land vehicle type device (e.g., an automated car that drives around a property). In some cases, the robotic device 780 may be a robotic device that is intended for other purposes and is merely associated with the monitoring system 700 for use in appropriate circumstances. For instance, a robotic vacuum cleaner device may be associated with the monitoring system 700 as one of the robotic devices 780 and may be controlled to take action responsive to monitoring system events.

In some examples, the robotic device 780 may automatically navigate within a property. In these examples, the robotic device 780 may include sensors and control processors that guide movement of the robotic device 780 within the property. For instance, the robotic device 780 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic device 780 may include control processors that process output from the various sensors and control the robotic device 780 to move along a path that reaches the desired destination and avoids obstacles. In this regard, the control processors detect walls or other obstacles in the property and guide movement of the robotic device 780 in a manner that avoids the walls and other obstacles.

In addition, the robotic device 780 may store data that describes attributes of the property. For instance, the robotic device 780 may store a floorplan and/or a three-dimensional model of the property that enables the robotic device 780 to navigate the property. During initial configuration, the robotic device 780 may receive the data describing attributes of the property, determine a frame of reference to the data (e.g., a home or reference location in the property), and navigate the property based on the frame of reference and the data describing attributes of the property. Further, initial configuration of the robotic device 780 also may include learning of one or more navigation patterns in which a user provides input to control the robotic device 780 to perform a specific navigation action (e.g., fly to an upstairs bedroom and spin around while capturing video and then return to a home charging base). In this regard, the robotic device 780 may learn and store the navigation patterns such that the robotic device 780 may automatically repeat the specific navigation actions upon a later request.

In some examples, the robotic device 780 may include data capture and recording devices. In these examples, the robotic device 780 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic device 780 to take and store a biometric sample that can be used to identify the person (e.g., a biometric sample with DNA that can be used for DNA testing).

In some implementations, the robotic device 780 may include one or more output devices. In these implementations, the robotic device 780 may include one or more displays, one or more speakers, one or more projectors, and/or any type of output devices that allow the robotic device 780 to communicate information to a nearby user. The one or more projectors may include projectors that project a two-dimensional image onto a surface (e.g., wall, floor, or ceiling) and/or holographic projectors that project three-dimensional holograms into a nearby space.

The robotic device 780 also may include a communication module that enables the robotic device 780 to communicate with the monitoring system control unit 710, each other, and/or other devices. The communication module may be a wireless communication module that allows the robotic device 780 to communicate wirelessly. For instance, the communication module may be a Wi-Fi module that enables the robotic device 780 to communicate over a local wireless network at the property. The communication module may further may be a 700 MHz wireless communication module that enables the robotic device 780 to communicate directly with the monitoring system control unit 710. Other types of short-range wireless communication protocols, such as Bluetooth, Bluetooth LE, Zwave, ZigBee, etc., may be used to allow the robotic device 780 to communicate with other devices in the property.

The robotic device 780 further may include processor and storage capabilities. The robotic device 780 may include any suitable processing devices that enable the robotic device 780 to operate applications and perform the actions described throughout this disclosure. In addition, the robotic device 780 may include solid state electronic storage that enables the robotic device 780 to store applications, configuration data, collected sensor data, and/or any other type of information available to the robotic device 780.

The robotic device 780 is associated with a charging station 790. The charging stations 790 may be located at predefined home base or reference locations in the property. The robotic device 780 may be configured to navigate to the charging station 790 after completion of tasks needed to be performed for the monitoring system 700. For instance, after completion of an investigation of a potential jamming event or upon instruction by the monitoring system control unit 710, the robotic device 780 may be configured to automatically fly to and land on a charging station 790. In this regard, the robotic device 780 may automatically maintain a fully charged battery in a state in which the robotic device 780 are ready for use by the monitoring system 700.

The robotic device 780 may also be configured to perform the operations described with reference to the drone 130 (or other drones) described with reference to FIGS. 1-6.

The charging station 790 may be contact based charging stations and/or wireless charging stations. For contact based charging stations, the robotic device 780 may have readily accessible points of contact that the robotic device 780 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic device 780 may charge through a wireless exchange of power. In these cases, the robotic device 780 need only locate itself closely enough to the wireless charging stations for the wireless exchange of power to occur. In this regard, the positioning needed to land at a predefined home base or reference location in the property may be less precise than with a contact based charging station. Based on the robotic device 780 landing at a wireless charging station, the wireless charging station outputs a wireless signal that the robotic device 780 receives and converts to a power signal that charges a battery maintained on the robotic device 780.

The sensor 720, the module 725, the camera 730, the thermostat 734, and the robotic device 780 can communicate with the controller 712 over communication links 727, 726, 728, 732, 738, 784, and 786. The communication links 727, 726, 728, 732, 738, 784, 786 may be a wired or wireless data pathway configured to transmit signals from the sensor 720, the module 725, the camera 730, the thermostat 734, and the robotic device 780 to the controller 712. The sensor 720, the module 725, the camera 730, the thermostat 734, and the robotic device 780 may continuously transmit sensed values to the controller 712, periodically transmit sensed values to the controller 712, or transmit sensed values to the controller 712 in response to a change in a sensed value.

The communication links 727, 726, 728, 732, 738, 784, and 786 may include a local network. The sensor 720, the module 725, the camera 730, the thermostat 734, the robotic device 780, and the controller 712 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 7 (CAT5) or Category 7 (CAT6) wired Ethernet network. The local network may be a mesh network constructed based on the devices connected to the mesh network.

The monitoring application server 790 is an electronic device configured to provide monitoring services by exchanging electronic communications with the monitoring system control unit 710, the one or more user devices 740, 750, and the central alarm station server 770 over the network 705. For example, the monitoring application server 790 may be configured to monitor events (e.g., alarm events) generated by the monitoring system control unit 710. In this example, the monitoring application server 790 may exchange electronic communications with the network module 714 included in the monitoring system control unit 710 to receive information regarding events (e.g., alarm events) detected by the monitoring system control unit 710. The monitoring application server 790 also may receive information regarding events (e.g., alarm events) from the one or more user devices 740, 750.

In some examples, the monitoring application server 790 may route alarm data received from the network module 714 or the one or more user devices 740, 750 to the central alarm station server 770. For example, the monitoring application server 790 may transmit the alarm data to the central alarm station server 770 over the network 705.

The monitoring application server 790 may store sensor and image data received from the monitoring system and perform analysis of sensor and image data received from the monitoring system. Based on the analysis, the monitoring application server 790 may communicate with and control aspects of the monitoring system control unit 710 or the one or more user devices 740, 750.

The monitoring application server 790 may also be configured to perform operations of the monitoring system control unit 110 (or other monitoring units) described with reference to FIGS. 1-6.

The central alarm station server 770 is an electronic device configured to provide alarm monitoring service by exchanging communications with the monitoring system control unit 710, the one or more mobile devices 740, 750, and the monitoring application server 790 over the network 705. For example, the central alarm station server 770 may be configured to monitor alarm events generated by the monitoring system control unit 710. In this example, the central alarm station server 770 may exchange communications with the network module 714 included in the monitoring system control unit 710 to receive information regarding alarm events detected by the monitoring system control unit 710. The central alarm station server 770 also may receive information regarding alarm events from the one or more mobile devices 740, 750 and/or the monitoring application server 790.

The central alarm station server 770 is connected to multiple terminals 772 and 774. The terminals 772 and 774 may be used by operators to process alarm events. For example, the central alarm station server 770 may route alarm data to the terminals 772 and 774 to enable an operator to process the alarm data. The terminals 772 and 774 may include general-purpose computers (e.g., desktop personal computers, workstations, or laptop computers) that are configured to receive alarm data from a server in the central alarm station server 770 and render a display of information based on the alarm data. For instance, the controller 712 may control the network module 714 to transmit, to the central alarm station server 770, alarm data indicating that a sensor 720 detected a door opening when the monitoring system was armed. The central alarm station server 770 may receive the alarm data and route the alarm data to the terminal 772 for processing by an operator associated with the terminal 772. The terminal 772 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 772 and 774 may be mobile devices or devices designed for a specific function. Although FIG. 7 illustrates two terminals for brevity, actual implementations may include more (and, perhaps, many more) terminals.

The one or more user devices 740, 750 are devices that host and display user interfaces. For instance, the user device 740 is a mobile device that hosts one or more native applications (e.g., the native surveillance application 742). The user device 740 may be a cellular phone or a non-cellular locally networked device with a display. The user device 740 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 740 may perform functions unrelated to the monitoring system, such as placing personal telephone calls, playing music, playing video, displaying pictures, browsing the Internet, maintaining an electronic calendar, etc.

The user device 740 includes a native surveillance application 742. The native surveillance application 742 refers to a software/firmware program running on the corresponding mobile device that enables the user interface and features described throughout. The user device 740 may load or install the native surveillance application 742 based on data received over a network or data received from local media. The native surveillance application 742 runs on mobile devices platforms, such as iPhone, iPod touch, Blackberry, Google Android, Windows Mobile, etc. The native surveillance application 742 enables the user device 740 to receive and process image and sensor data from the monitoring system.

The user device 750 may be a general-purpose computer (e.g., a desktop personal computer, a workstation, or a laptop computer) that is configured to communicate with the monitoring application server 790 and/or the monitoring system control unit 710 over the network 705. The user device 750 may be configured to display a surveillance monitoring user interface 752 that is generated by the user device 750 or generated by the monitoring application server 790. For example, the user device 750 may be configured to display a user interface (e.g., a web page) provided by the monitoring application server 790 that enables a user to perceive images captured by the camera 730 and/or reports related to the monitoring system. Although FIG. 7 illustrates two user devices for brevity, actual implementations may include more (and, perhaps, many more) or fewer user devices.

In some implementations, the one or more user devices 740, 750 communicate with and receive monitoring system data from the monitoring system control unit 710 using the communication link 738. For instance, the one or more user devices 740, 750 may communicate with the monitoring system control unit 710 using various local wireless protocols such as Wi-Fi, Bluetooth, Zwave, ZigBee, HomePlug (Ethernet over powerline), or wired protocols such as Ethernet and USB, to connect the one or more user devices 740, 750 to local security and automation equipment. The one or more user devices 740, 750 may connect locally to the monitoring system and its sensors and other devices. The local connection may improve the speed of status and control communications because communicating through the network 705 with a remote server (e.g., the monitoring application server 790) may be significantly slower.

Although the one or more user devices 740, 750 are shown as communicating with the monitoring system control unit 710, the one or more user devices 740, 750 may communicate directly with the sensors and other devices controlled by the monitoring system control unit 710. In some implementations, the one or more user devices 740, 750 replace the monitoring system control unit 710 and perform the functions of the monitoring system control unit 710 for local monitoring and long range/offsite communication.

In other implementations, the one or more user devices 740, 750 receive monitoring system data captured by the monitoring system control unit 710 through the network 705. The one or more user devices 740, 750 may receive the data from the monitoring system control unit 710 through the network 705 or the monitoring application server 790 may relay data received from the monitoring system control unit 710 to the one or more user devices 740, 750 through the network 705. In this regard, the monitoring application server 790 may facilitate communication between the one or more user devices 740, 750 and the monitoring system.

In some implementations, the one or more user devices 740, 750 may be configured to switch whether the one or more user devices 740, 750 communicate with the monitoring system control unit 710 directly (e.g., through link 738) or through the monitoring application server 790 (e.g., through network 705) based on a location of the one or more user devices 740, 750. For instance, when the one or more user devices 740, 750 are located close to the monitoring system control unit 710 and in range to communicate directly with the monitoring system control unit 710, the one or more user devices 740, 750 use direct communication. When the one or more user devices 740, 750 are located far from the monitoring system control unit 710 and not in range to communicate directly with the monitoring system control unit 710, the one or more user devices 740, 750 use communication through the monitoring application server 790.

Although the one or more user devices 740, 750 are shown as being connected to the network 705, in some implementations, the one or more user devices 740, 750 are not connected to the network 705. In these implementations, the one or more user devices 740, 750 communicate directly with one or more of the monitoring system components and no network (e.g., Internet) connection or reliance on remote servers is needed.

In some implementations, the one or more user devices 740, 750 are used in conjunction with only local sensors and/or local devices in a house. In these implementations, the system 700 only includes the one or more user devices 740, 750, the sensor 720, the module 725, the camera 730, and the robotic device 780. The one or more user devices 740, 750 receive data directly from the sensor 720, the module 725, the camera 730, and the robotic device 780 and sends data directly to the sensor 720, the module 725, the camera 730, and the robotic device 780. The one or more user devices 740, 750 provide the appropriate interfaces/processing to provide visual surveillance and reporting.

In other implementations, the system 700 further includes network 705 and the sensor 720, the module 725, the camera 730, the thermostat 734, the robotic device 780, and the homes assistant 796 are configured to communicate sensor and image data to the one or more user devices 740, 750 over network 705 (e.g., the Internet, cellular network, etc.). In yet another implementation, the sensor 720, the module 725, the camera 730, the thermostat 734, the robotic device 780 (or a component, such as a bridge/router) are intelligent enough to change the communication pathway from a direct local pathway when the one or more user devices 740, 750 are in close physical proximity to the sensor 720, the module 725, the camera 730, the thermostat 734, and the robotic device 780 to a pathway over network 705 when the one or more user devices 740, 750 are farther from the sensor 720, the module 725, the camera 730, the thermostat 734, and the robotic device 780. In some examples, the system leverages GPS information from the one or more user devices 740, 750 to determine whether the one or more user devices 740, 750 are close enough to the sensor 720, the module 725, the camera 730, the thermostat 734, the robotic device 780 to use the direct local pathway or whether the one or more user devices 740, 750 are far enough from the sensor 720, the module 725, the camera 730, the thermostat 734, and the robotic device 780 that the pathway over network 705 is required. In other examples, the system leverages status communications (e.g., pinging) between the one or more user devices 740, 750 and the sensor 720, the module 725, the camera 730, the thermostat 734, the robotic device 780 to determine whether communication using the direct local pathway is possible. If communication using the direct local pathway is possible, the one or more user devices 740, 750 communicate with the sensor 720, the module 725, the camera 730, the thermostat 734, and the robotic device 780 using the direct local pathway. If communication using the direct local pathway is not possible, the one or more user devices 740, 750 communicate with the sensor 720, the module 725, the camera 730, the thermostat 734, and the robotic device 780 using the pathway over network 705.

The invention claimed is:

1. A method comprising:
   extracting, by a monitoring system, an identifier of a drone beacon, wherein the identifier does not specify an explicit drone beacon location;
   selecting, by a monitoring system, a first location of the drone beacon based on the identifier, wherein the identifier is used to select the first location from a stored map of among multiple possible locations;
   transmitting, by the monitoring system and to a drone, a first instruction to navigate towards the first location;
   obtaining, by the monitoring system, sensor data associated with the monitoring system; and
   based on obtaining the sensor data, transmitting, by the monitoring system and to the drone, a second instruction to navigate towards a second location that is different than the first location.

2. The method of claim 1, wherein the identifier is extracted from drone beacon data generated by the drone beacon in response to detection of a moving object within a predetermined distance of the drone beacon.

3. The method of claim 2, wherein the drone beacon data does not include an explicit drone beacon location.

4. The method of claim 1, wherein:
   the sensor data comprises component data generated by a component of the monitoring system; and
   the second location comprises a location of the component.

5. The method of claim 4, further comprising:
   obtaining, by the monitoring system, drone beacon data generated by a second drone beacon that is located at a location that is different from the first location; and
   the second location comprises a location of the second drone beacon.

6. The method of claim 1, wherein:
   selecting the first location of the drone beacon comprises selecting the first location from a map that identifies the multiple possible locations; and
   the map is stored in a memory device accessible to the monitoring system.

7. The method of claim 1, wherein:
   the sensor data is collected by a component of the monitoring system; and
   the component comprises a camera, a motion sensor, a drone sensor, a drone camera, or a drone beacon.

8. A system comprising:
   one or more processors; and
   at least one non-transitory computer-readable storage medium storing instructions that, when executed by the one or more processors, cause the one or more processors to perform operations comprising:
   extracting, by a monitoring system, an identifier of a drone beacon, wherein the identifier does not specify an explicit drone beacon location;
   selecting, by a monitoring system, a first location of the drone beacon based on the identifier, wherein the identifier is used to select the first location from a stored map of among multiple possible locations;

transmitting, by the monitoring system and to a drone, a first instruction to navigate towards the first location;

obtaining, by the monitoring system, sensor data associated with the monitoring system; and based on obtaining the sensor data, transmitting, by the monitoring system and to the drone, a second instruction to navigate towards a second location that is different than the first location.

9. The system of claim 8, wherein the identifier is extracted from drone beacon data generated by the drone beacon in response to detection of a moving object within a predetermined distance of the drone beacon.

10. The system of claim 9, wherein the drone beacon data does not include an explicit drone beacon location.

11. The system of claim 8, wherein:

the sensor data comprises component data generated by a component of the monitoring system; and the second location comprises a location of the component.

12. The system of claim 11, wherein the operations further comprise:

obtaining, by the monitoring system, drone beacon data generated by a second drone beacon that is located at a location that is different from the first location; and the second location comprises a location of the second drone beacon.

13. The system of claim 8, wherein:

selecting the first location of the drone beacon comprises selecting the first location from a map that identifies the multiple possible locations; and the map is stored in a memory device accessible to the monitoring system.

14. The method system of claim 8, wherein:

the sensor data is collected by a component of the monitoring system; and the component comprises a camera, a motion sensor, a drone sensor, a drone camera, or a drone beacon.

15. At least one non-transitory computer-readable storage medium storing instructions that, when executed by one or more processors, cause the one or more processors to perform operations comprising:

extracting, by a monitoring system, an identifier of a drone beacon, wherein the identifier does not specify an explicit drone beacon location;

selecting, by a monitoring system, a first location of the drone beacon based on the identifier, wherein the identifier is used to select the first location from a stored map of among multiple possible locations;

transmitting, by the monitoring system and to a drone, a first instruction to navigate towards the first location;

obtaining, by the monitoring system, sensor data associated with the monitoring system; and based on obtaining the sensor data, transmitting, by the monitoring system and to the drone, a second instruction to navigate towards a second location that is different than the first location.

16. The non-transitory computer-readable storage medium of claim 15, wherein the identifier is extracted from drone beacon data generated by the drone beacon in response to detection of a moving object within a predetermined distance of the drone beacon.

17. The non-transitory computer-readable storage medium of claim 16, wherein the drone beacon data does not include an explicit drone beacon location.

18. The non-transitory computer-readable storage medium of claim 15, wherein:

the sensor data comprises component data generated by a component of the monitoring system; and the second location comprises a location of the component.

19. The non-transitory computer-readable storage medium of claim 18, wherein the operations comprise:

obtaining, by the monitoring system, drone beacon data generated by a second drone beacon that is located at a location that is different from the first location; and the second location comprises a location of the second drone beacon.

20. The non-transitory computer-readable storage medium of claim 15, wherein:

selecting the first location of the drone beacon comprises selecting the first location from a map that identifies the multiple possible locations; and the map is stored in a memory device accessible to the monitoring system.

* * * * *